US011271909B2

(12) United States Patent
Tidwell et al.

(10) Patent No.: US 11,271,909 B2
(45) Date of Patent: *Mar. 8, 2022

(54) APPARATUS AND METHODS ENSURING DATA PRIVACY IN A CONTENT DISTRIBUTION NETWORK

(71) Applicant: TIME WARNER CABLE ENTERPRISES LLC, St. Louis, MO (US)

(72) Inventors: Justin Tidwell, Waxhaw, NC (US); Eduardo Samame, Rowayton, CT (US); Craig Engel, Shamong, NJ (US); Craig Goldberg, Weston, CT (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 44 days.

This patent is subject to a terminal disclaimer.

(21) Appl. No.: 16/208,299

(22) Filed: Dec. 3, 2018

(65) Prior Publication Data

US 2019/0182218 A1 Jun. 13, 2019

Related U.S. Application Data

(63) Continuation of application No. 12/944,985, filed on Nov. 12, 2010, now Pat. No. 10,148,623.

(51) Int. Cl.
*G06F 21/62* (2013.01)
*H04L 29/06* (2006.01)
*H04H 60/31* (2008.01)

(52) U.S. Cl.
CPC ...... *H04L 63/0421* (2013.01); *G06F 21/6254* (2013.01); *H04H 60/31* (2013.01)

(58) Field of Classification Search
CPC .......................... H04L 63/0421; G06F 21/6254
See application file for complete search history.

(56) References Cited

U.S. PATENT DOCUMENTS 5,528,284 A 6/1996 Iwami et al.
5,708,961 A 1/1998 Hylton et al.
(Continued)

FOREIGN PATENT DOCUMENTS

JP 2005519365 A 6/2005
JP 2005519501 A 6/2005
(Continued)

OTHER PUBLICATIONS

Cantor, et al., Bindings for the OASIS Security Assertion Markup Language (SAML) V2.0, OASIS Standard, Mar. 2005, Document ID saml-bindings-2.0-os ,(http://docs.oasis-open.org/security/saml/v2.0/saml-bindings-2.0-os.pdf).
(Continued)

*Primary Examiner* — Jason D Recek
(74) *Attorney, Agent, or Firm* — Gazdzinski & Associates, PC

(57) ABSTRACT

Methods and apparatus for ensuring the privacy of users and/or devices in a content delivery network from which data regarding the users' interaction with content is collected and distributed. In one embodiment, "tuning" records which describe the interaction of users with content or other activities of interest are collected. It is determined whether an opportunity for compromise of the user's privacy (e.g., by derivative association) is present. If it is determined that such an opportunity exists, at least portions of the data are modified (e.g., collapsed). The modification may comprise replacing a first explicit data value with a second descriptive data value, increasing a range for the value, generalizing the value, removing the value, or encoding the value. Further processing of the collected tuning records may include, validating the data, accounting for latency, and generating reports based thereon.

24 Claims, 16 Drawing Sheets

(56) References Cited

U.S. PATENT DOCUMENTS

| | | |
|---|---|---|
| 5,719,938 A | 2/1998 | Haas et al. |
| 5,758,257 A | 5/1998 | Herz et al. |
| 5,796,423 A | 8/1998 | Robbins et al. |
| 5,818,438 A | 10/1998 | Howe et al. |
| 5,862,140 A | 1/1999 | Shen et al. |
| 5,897,635 A | 4/1999 | Torres et al. |
| 5,988,078 A | 11/1999 | Levine |
| 6,029,045 A | 2/2000 | Picco et al. |
| 6,052,145 A | 4/2000 | Macrae et al. |
| 6,088,722 A | 7/2000 | Herz et al. |
| 6,133,910 A | 10/2000 | Stinebruner |
| 6,167,432 A | 12/2000 | Jiang |
| 6,181,697 B1 | 1/2001 | Nurenberg et al. |
| 6,198,744 B1 | 3/2001 | Huggins et al. |
| 6,219,710 B1 | 4/2001 | Gray et al. |
| 6,252,634 B1 | 6/2001 | Yuen et al. |
| 6,259,701 B1 | 7/2001 | Shur et al. |
| 6,389,538 B1 | 5/2002 | Gruse et al. |
| 6,446,261 B1 | 9/2002 | Rosser |
| 6,460,182 B1 | 10/2002 | Buabbud |
| 6,463,585 B1 | 10/2002 | Hendricks et al. |
| 6,486,907 B1 | 11/2002 | Farber et al. |
| 6,487,721 B1 | 11/2002 | Safadi |
| 6,519,062 B1 | 2/2003 | Yoo |
| 6,523,696 B1 | 2/2003 | Saito et al. |
| 6,539,548 B1 | 3/2003 | Hendricks et al. |
| 6,608,837 B1 | 8/2003 | Brodigan |
| 6,640,145 B2 | 10/2003 | Hoffberg et al. |
| 6,694,145 B2 | 2/2004 | Riikonen et al. |
| 6,697,376 B1 | 2/2004 | Son et al. |
| 6,698,020 B1 | 2/2004 | Zigmond et al. |
| 6,728,269 B1 | 4/2004 | Godwin et al. |
| 6,760,537 B2 | 7/2004 | Mankovitz |
| 6,785,904 B1 | 8/2004 | Franken et al. |
| RE38,600 E | 9/2004 | Mankovitz et al. |
| 6,788,676 B2 | 9/2004 | Partanen et al. |
| 6,788,775 B1 | 9/2004 | Simpson |
| 6,799,326 B2 | 9/2004 | Boylan et al. |
| 6,807,676 B1 | 10/2004 | Robbins et al. |
| 6,873,622 B1 | 3/2005 | Dodson et al. |
| 6,925,257 B2 | 8/2005 | Yoo |
| 6,944,150 B1 | 9/2005 | McConnell et al. |
| 7,003,670 B2 | 2/2006 | Heaven et al. |
| 7,006,881 B1 | 2/2006 | Hoffberg et al. |
| 7,009,972 B2 | 3/2006 | Maher et al. |
| 7,027,460 B2 | 4/2006 | Iyer et al. |
| 7,039,048 B1 | 5/2006 | Monta et al. |
| 7,039,932 B2 | 5/2006 | Eldering |
| 7,054,902 B2 | 5/2006 | Toporek et al. |
| 7,068,639 B1 | 6/2006 | Varma et al. |
| 7,085,287 B1 | 8/2006 | Chapman |
| 7,099,308 B2 | 8/2006 | Merrill et al. |
| 7,099,348 B1 | 8/2006 | Warwick |
| 7,106,382 B2 | 9/2006 | Shiotsu |
| 7,149,772 B1 | 12/2006 | Kalavade |
| 7,174,126 B2 | 2/2007 | McElhatten et al. |
| 7,174,127 B2 | 2/2007 | Otten et al. |
| 7,174,385 B2 | 2/2007 | Li |
| 7,185,353 B2 | 2/2007 | Schlack |
| 7,188,085 B2 | 3/2007 | Pelletier |
| 7,209,458 B2 | 4/2007 | Ahvonen et al. |
| 7,213,036 B2 | 5/2007 | Apparao et al. |
| 7,242,960 B2 | 7/2007 | Van et al. |
| 7,242,988 B1 | 7/2007 | Hoffberg et al. |
| 7,254,608 B2 | 8/2007 | Yeager et al. |
| 7,325,073 B2 | 1/2008 | Shao et al. |
| 7,330,483 B1 | 2/2008 | Peters, Jr. et al. |
| 7,359,375 B2 | 4/2008 | Lipsanen et al. |
| 7,363,643 B2 | 4/2008 | Drake et al. |
| 7,376,386 B2 | 5/2008 | Phillips et al. |
| 7,383,243 B2 | 6/2008 | Conkwright et al. |
| 7,444,655 B2 | 10/2008 | Sardera |
| 7,457,520 B2 | 11/2008 | Rosetti et al. |
| 7,486,869 B2 | 2/2009 | Alexander et al. |
| 7,567,983 B2 | 7/2009 | Pickelsimer et al. |
| 7,592,912 B2 | 9/2009 | Hasek et al. |
| 7,602,820 B2 | 10/2009 | Helms et al. |
| 7,650,319 B2 | 1/2010 | Hoffberg et al. |
| 7,690,020 B2 | 3/2010 | Lebar |
| 7,693,171 B2 | 4/2010 | Gould |
| 7,716,668 B2 | 5/2010 | Moore et al. |
| 7,721,314 B2 | 5/2010 | Sincaglia et al. |
| 7,742,074 B2 | 6/2010 | Minatogawa |
| 7,768,546 B1 | 8/2010 | Boehringer, Jr. |
| 7,770,200 B2 | 8/2010 | Brooks et al. |
| 7,809,942 B2 | 10/2010 | Baran et al. |
| 7,873,660 B1 * | 1/2011 | Wong .................. G06F 21/6245 707/705 |
| 7,878,660 B2 | 2/2011 | Yang et al. |
| 7,889,765 B2 | 2/2011 | Brooks et al. |
| 7,900,052 B2 | 3/2011 | Jonas et al. |
| 7,954,131 B2 | 5/2011 | Cholas et al. |
| 8,078,669 B2 | 12/2011 | Ladd et al. |
| 8,099,757 B2 | 1/2012 | Riedl et al. |
| 8,244,909 B1 | 8/2012 | Hanson et al. |
| 8,347,341 B2 | 1/2013 | Markley et al. |
| 8,484,511 B2 | 7/2013 | Engel et al. |
| 8,855,469 B2 | 10/2014 | Maharajh et al. |
| 9,213,538 B1 | 12/2015 | Ladd et al. |
| 2001/0004768 A1 | 6/2001 | Hodge et al. |
| 2001/0033583 A1 | 10/2001 | Rabenko et al. |
| 2002/0007491 A1 | 1/2002 | Schiller et al. |
| 2002/0024943 A1 | 2/2002 | Karaul et al. |
| 2002/0027883 A1 | 3/2002 | Belaiche |
| 2002/0032754 A1 | 3/2002 | Logston et al. |
| 2002/0056125 A1 | 5/2002 | Hodge et al. |
| 2002/0059619 A1 | 5/2002 | Lebar |
| 2002/0066033 A1 | 5/2002 | Dobbins et al. |
| 2002/0078444 A1 | 6/2002 | Krewin et al. |
| 2002/0087976 A1 | 7/2002 | Kaplan et al. |
| 2002/0104002 A1 * | 8/2002 | Nishizawa .......... H04L 63/0428 713/168 |
| 2002/0123928 A1 | 9/2002 | Eldering et al. |
| 2002/0133513 A1 | 9/2002 | Townsend et al. |
| 2002/0144260 A1 | 10/2002 | Devara |
| 2002/0147771 A1 | 10/2002 | Traversat et al. |
| 2002/0152299 A1 | 10/2002 | Traversat et al. |
| 2002/0166120 A1 | 11/2002 | Boylan et al. |
| 2002/0178446 A1 | 11/2002 | Sie et al. |
| 2002/0188744 A1 | 12/2002 | Mani |
| 2002/0188869 A1 | 12/2002 | Patrick |
| 2003/0002577 A1 | 1/2003 | Pinder |
| 2003/0016627 A1 | 1/2003 | Melampy et al. |
| 2003/0016701 A1 | 1/2003 | Hinson |
| 2003/0023983 A1 | 1/2003 | Pidgeon et al. |
| 2003/0028888 A1 | 2/2003 | Hunter et al. |
| 2003/0056217 A1 | 3/2003 | Brooks |
| 2003/0115267 A1 | 6/2003 | Hinton et al. |
| 2003/0126611 A1 | 7/2003 | Chernock et al. |
| 2003/0126618 A1 | 7/2003 | Wright |
| 2003/0149975 A1 | 8/2003 | Eldering et al. |
| 2003/0165241 A1 | 9/2003 | Fransdonk |
| 2003/0166401 A1 | 9/2003 | Combes et al. |
| 2003/0208767 A1 | 11/2003 | Williamson et al. |
| 2003/0213001 A1 | 11/2003 | Yuen et al. |
| 2003/0217137 A1 | 11/2003 | Roese et al. |
| 2003/0217365 A1 | 11/2003 | Caputo |
| 2003/0220100 A1 | 11/2003 | McElhatten et al. |
| 2003/0221191 A1 | 11/2003 | Khusheim |
| 2003/0225777 A1 | 12/2003 | Marsh |
| 2004/0015398 A1 | 1/2004 | Hayward |
| 2004/0024880 A1 | 2/2004 | Elving et al. |
| 2004/0034877 A1 | 2/2004 | Nogues |
| 2004/0040035 A1 | 2/2004 | Carlucci et al. |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0133923 A1 | 7/2004 | Watson et al. |
| 2004/0137918 A1 | 7/2004 | Varonen et al. |
| 2004/0148625 A1 | 7/2004 | Eldering et al. |
| 2004/0158858 A1 | 8/2004 | Paxton et al. |
| 2004/0181800 A1 | 9/2004 | Rakib et al. |
| 2004/0213389 A1 * | 10/2004 | Ljubicich ................ H04M 3/51 379/111 |

(56) References Cited

U.S. PATENT DOCUMENTS

| | | |
|---|---|---|
| 2004/0226043 A1 | 11/2004 | Mettu et al. |
| 2004/0230994 A1 | 11/2004 | Urdang et al. |
| 2004/0250273 A1 | 12/2004 | Swix et al. |
| 2005/0022247 A1 | 1/2005 | Bitran et al. |
| 2005/0034171 A1 | 2/2005 | Benya |
| 2005/0049886 A1 | 3/2005 | Grannan et al. |
| 2005/0055220 A1 | 3/2005 | Lee et al. |
| 2005/0055685 A1 | 3/2005 | Maynard et al. |
| 2005/0060742 A1 | 3/2005 | Riedl et al. |
| 2005/0086334 A1 | 4/2005 | Aaltonen et al. |
| 2005/0086683 A1 | 4/2005 | Meyerson |
| 2005/0108763 A1 | 5/2005 | Baran et al. |
| 2005/0114900 A1 | 5/2005 | Ladd et al. |
| 2005/0125824 A1 | 6/2005 | Bienstock |
| 2005/0177855 A1 | 8/2005 | Maynard et al. |
| 2005/0187823 A1 | 8/2005 | Howes |
| 2005/0190794 A1 | 9/2005 | Krause et al. |
| 2005/0198686 A1 | 9/2005 | Krause et al. |
| 2005/0216933 A1 | 9/2005 | Black |
| 2005/0228725 A1 | 10/2005 | Rao et al. |
| 2005/0235307 A1 | 10/2005 | Relan et al. |
| 2005/0289618 A1 | 12/2005 | Hardin |
| 2006/0017846 A1 | 1/2006 | Kim et al. |
| 2006/0020786 A1 | 1/2006 | Helms et al. |
| 2006/0021004 A1 | 1/2006 | Moran et al. |
| 2006/0041905 A1 | 2/2006 | Wasilewski |
| 2006/0047957 A1 | 3/2006 | Helms et al. |
| 2006/0074875 A1* | 4/2006 | Faunce ............... G06F 16/2462 |
| 2006/0095940 A1 | 5/2006 | Yearwood |
| 2006/0117354 A1 | 6/2006 | Schutte et al. |
| 2006/0130099 A1 | 6/2006 | Rooyen |
| 2006/0130101 A1 | 6/2006 | Wessel et al. |
| 2006/0130107 A1 | 6/2006 | Gonder et al. |
| 2006/0130113 A1 | 6/2006 | Carlucci et al. |
| 2006/0136964 A1 | 6/2006 | Diez et al. |
| 2006/0149624 A1 | 7/2006 | Baluja et al. |
| 2006/0149850 A1 | 7/2006 | Bowman |
| 2006/0156332 A1 | 7/2006 | Kendall |
| 2006/0161635 A1 | 7/2006 | Lamkin et al. |
| 2006/0168609 A1 | 7/2006 | Chen |
| 2006/0171390 A1 | 8/2006 | La |
| 2006/0171423 A1 | 8/2006 | Helms et al. |
| 2006/0187900 A1 | 8/2006 | Akbar |
| 2006/0206712 A1 | 9/2006 | Dillaway et al. |
| 2006/0209799 A1 | 9/2006 | Gallagher et al. |
| 2006/0218604 A1 | 9/2006 | Riedl et al. |
| 2006/0225118 A1 | 10/2006 | Rolls et al. |
| 2006/0233372 A1 | 10/2006 | Shaheen et al. |
| 2006/0248553 A1 | 11/2006 | Mikkelson et al. |
| 2006/0248556 A1 | 11/2006 | Yuen et al. |
| 2006/0251097 A1 | 11/2006 | Chapman et al. |
| 2006/0259927 A1 | 11/2006 | Acharya et al. |
| 2006/0287915 A1 | 12/2006 | Boulet et al. |
| 2006/0291506 A1 | 12/2006 | Cain |
| 2007/0019645 A1 | 1/2007 | Menon |
| 2007/0022459 A1 | 1/2007 | Gaebel et al. |
| 2007/0022469 A1 | 1/2007 | Cooper et al. |
| 2007/0033531 A1 | 2/2007 | Marsh |
| 2007/0049245 A1 | 3/2007 | Lipman |
| 2007/0055984 A1 | 3/2007 | Schiller et al. |
| 2007/0061023 A1 | 3/2007 | Hoffberg et al. |
| 2007/0067851 A1 | 3/2007 | Fernando et al. |
| 2007/0076728 A1 | 4/2007 | Rieger et al. |
| 2007/0094691 A1 | 4/2007 | Gazdzinski |
| 2007/0121678 A1 | 5/2007 | Brooks et al. |
| 2007/0124488 A1 | 5/2007 | Baum et al. |
| 2007/0136777 A1 | 6/2007 | Hasek et al. |
| 2007/0157262 A1 | 7/2007 | Ramaswamy et al. |
| 2007/0180230 A1 | 8/2007 | Cortez |
| 2007/0186228 A1 | 8/2007 | Ramaswamy et al. |
| 2007/0198839 A1 | 8/2007 | Carle et al. |
| 2007/0204314 A1 | 8/2007 | Hasek et al. |
| 2007/0209059 A1 | 9/2007 | Moore et al. |
| 2007/0217436 A1 | 9/2007 | Markley et al. |
| 2007/0219910 A1 | 9/2007 | Martinez |
| 2007/0245376 A1 | 10/2007 | Svendsen |
| 2007/0250880 A1 | 10/2007 | Hainline |
| 2007/0261116 A1 | 11/2007 | Prafullchandra et al. |
| 2007/0276926 A1 | 11/2007 | LaJoie et al. |
| 2007/0280298 A1 | 12/2007 | Hearn et al. |
| 2007/0288715 A1 | 12/2007 | Boswell et al. |
| 2008/0022012 A1 | 1/2008 | Wang |
| 2008/0059804 A1 | 3/2008 | Shah et al. |
| 2008/0066112 A1 | 3/2008 | Bailey et al. |
| 2008/0091805 A1 | 4/2008 | Malaby et al. |
| 2008/0091807 A1 | 4/2008 | Strub et al. |
| 2008/0098212 A1 | 4/2008 | Helms et al. |
| 2008/0112405 A1 | 5/2008 | Cholas et al. |
| 2008/0120667 A1 | 5/2008 | Zaltsman |
| 2008/0133551 A1 | 6/2008 | Wensley et al. |
| 2008/0155059 A1 | 6/2008 | Hardin et al. |
| 2008/0162353 A1 | 7/2008 | Tom et al. |
| 2008/0170551 A1 | 7/2008 | Zaks |
| 2008/0172287 A1 | 7/2008 | Tien et al. |
| 2008/0177998 A1 | 7/2008 | Apsangi et al. |
| 2008/0201386 A1 | 8/2008 | Maharajh et al. |
| 2008/0201731 A1 | 8/2008 | Howcroft |
| 2008/0209489 A1 | 8/2008 | Joyce et al. |
| 2008/0222684 A1 | 9/2008 | Mukraj et al. |
| 2008/0235746 A1 | 9/2008 | Peters et al. |
| 2008/0273591 A1 | 11/2008 | Brooks et al. |
| 2008/0279534 A1 | 11/2008 | Buttars |
| 2008/0282299 A1 | 11/2008 | Ko et al. |
| 2008/0306903 A1 | 12/2008 | Larson et al. |
| 2009/0083813 A1 | 3/2009 | Dolce et al. |
| 2009/0086643 A1 | 4/2009 | Kotrla et al. |
| 2009/0098861 A1 | 4/2009 | Kalliola et al. |
| 2009/0100459 A1 | 4/2009 | Riedl et al. |
| 2009/0100493 A1 | 4/2009 | Jones et al. |
| 2009/0133048 A1 | 5/2009 | Gibbs et al. |
| 2009/0150917 A1 | 6/2009 | Huffman et al. |
| 2009/0150926 A1 | 6/2009 | Schlack |
| 2009/0172776 A1 | 7/2009 | Makagon et al. |
| 2009/0185576 A1 | 7/2009 | Kisel et al. |
| 2009/0201917 A1 | 8/2009 | Maes et al. |
| 2009/0210912 A1 | 8/2009 | Cholas et al. |
| 2009/0217318 A1 | 8/2009 | Versteeg et al. |
| 2009/0217326 A1 | 8/2009 | Hasek |
| 2009/0225760 A1 | 9/2009 | Foti |
| 2009/0228569 A1 | 9/2009 | Kalmanje et al. |
| 2009/0249421 A1 | 10/2009 | Liu et al. |
| 2009/0282241 A1 | 11/2009 | Prafullchandra et al. |
| 2009/0282444 A1 | 11/2009 | Laksono |
| 2009/0293101 A1 | 11/2009 | Carter et al. |
| 2010/0005527 A1 | 1/2010 | Jeon |
| 2010/0027560 A1 | 2/2010 | Yang et al. |
| 2010/0030578 A1 | 2/2010 | Siddique et al. |
| 2010/0042478 A1 | 2/2010 | Reisman |
| 2010/0083329 A1 | 4/2010 | Joyce et al. |
| 2010/0106846 A1 | 4/2010 | Noldus et al. |
| 2010/0115091 A1 | 5/2010 | Park et al. |
| 2010/0115113 A1 | 5/2010 | Short et al. |
| 2010/0122276 A1* | 5/2010 | Chen ................ H04N 21/44222 725/9 |
| 2010/0125658 A1 | 5/2010 | Strasters |
| 2010/0131973 A1 | 5/2010 | Dillon et al. |
| 2010/0138900 A1 | 6/2010 | Peterka et al. |
| 2010/0169977 A1 | 7/2010 | Dasher et al. |
| 2010/0199299 A1 | 8/2010 | Chang et al. |
| 2010/0211967 A1 | 8/2010 | Ramaswamy et al. |
| 2010/0211982 A1 | 8/2010 | Lee et al. |
| 2010/0218231 A1 | 8/2010 | Frink et al. |
| 2010/0251305 A1 | 9/2010 | Kimble et al. |
| 2010/0280641 A1 | 11/2010 | Harkness et al. |
| 2010/0287209 A1 | 11/2010 | Hauser |
| 2010/0287609 A1 | 11/2010 | Gonzalez et al. |
| 2010/0313225 A1 | 12/2010 | Cholas et al. |
| 2011/0015989 A1 | 1/2011 | Tidwell et al. |
| 2011/0016479 A1 | 1/2011 | Tidwell et al. |
| 2011/0016482 A1 | 1/2011 | Tidwell et al. |
| 2011/0029507 A1* | 2/2011 | Au ...................... G06F 16/2456 707/714 |
| 2011/0071841 A1 | 3/2011 | Fomenko et al. |
| 2011/0090898 A1 | 4/2011 | Patel et al. |

(56) References Cited

U.S. PATENT DOCUMENTS

| | | |
|---|---|---|
| 2011/0093900 A1 | 4/2011 | Patel et al. |
| 2011/0099017 A1 | 4/2011 | Ure |
| 2011/0103374 A1 | 5/2011 | Lajoie et al. |
| 2011/0110515 A1 | 5/2011 | Tidwell et al. |
| 2011/0126018 A1 | 5/2011 | Narsinh et al. |
| 2011/0138064 A1 | 6/2011 | Rieger et al. |
| 2011/0173045 A1* | 7/2011 | Jaine .................. G06Q 10/06 705/7.28 |
| 2011/0178943 A1 | 7/2011 | Motahari et al. |
| 2011/0213688 A1 | 9/2011 | Santos et al. |
| 2011/0219229 A1 | 9/2011 | Cholas et al. |
| 2011/0265116 A1 | 10/2011 | Stern et al. |
| 2011/0267952 A1 | 11/2011 | Ko et al. |
| 2011/0283311 A1 | 11/2011 | Luong |
| 2012/0005527 A1 | 1/2012 | Engel et al. |
| 2012/0008786 A1 | 1/2012 | Cronk et al. |
| 2012/0011567 A1 | 1/2012 | Cronk et al. |
| 2012/0030363 A1 | 2/2012 | Conrad |
| 2012/0079518 A1 | 3/2012 | Wan et al. |
| 2012/0124606 A1 | 5/2012 | Tidwell et al. |

FOREIGN PATENT DOCUMENTS

| | | |
|---|---|---|
| JP | 2005339093 A | 12/2005 |
| JP | 2008015936 A | 1/2008 |
| JP | 2009211632 A | 9/2009 |
| JP | 2010502109 A | 1/2010 |
| JP | 2010079902 A | 4/2010 |
| JP | 2012505436 A | 3/2012 |
| JP | 2012523614 A | 10/2012 |
| WO | WO-2005015422 A1 | 2/2005 |
| WO | WO-2012021245 A1 | 2/2012 |

OTHER PUBLICATIONS

Denning, et al., Cryptography and Data Security, Addison-Wesley Publishing Company, ISBN 0-201-10150-5, 1982, pp. 62.

DLNA (Digital Living Network Alliance) protocols described in DLNA Networked Device Interoperability Guidelines Expanded, Mar. 2006 and subsequent expanded version dated Oct. 2006.

UTF-32, IBM, retrieved from http://publib.boulder.ibm.com/infocenter/iseries/v5r3/index.jsp?topic=%2Fnls%2Frbagsutf32.htm on Aug. 28, 2013.

* cited by examiner

APPARATUS AND METHODS ENSURING DATA PRIVACY IN A CONTENT DISTRIBUTION NETWORK

PRIORITY AND RELATED APPLICATIONS

This application is a continuation of and claims the benefit of priority to co-owned U.S. patent application Ser. No. 12/944,985 of the same title filed Nov. 12, 2010 and issuing as U.S. Pat. No. 10,148,623 on Dec. 4, 2018, which is incorporated herein by reference in its entirety.

This application is related to co-owned U.S. patent application Ser. No. 12/829,104 filed on Jul. 1, 2010 and entitled "APPARATUS AND METHODS FOR DATA COLLECTION, ANALYSIS AND VALIDATION INCLUDING ERROR CORRECTION IN A CONTENT DELIVERY NETWORK", issued as U.S. Pat. No. 8,484,511, co-owned U.S. patent application Ser. No. 12/944,648 filed on Nov. 11, 2010 and entitled "APPARATUS AND METHODS FOR IDENTIFYING AND CHARACTERIZING LATENCY IN A CONTENT DELIVERY NETWORK", issued as U.S. Pat. No. 8,930,979, and co-owned U.S. patent application Ser. No. 12/877,062 filed on Sep. 7, 2010 and entitled "METHODS AND APPARATUS FOR AUDIENCE DATA COLLECTION AND ANALYSIS IN A CONTENT DELIVERY NETWORK", issued as U.S. Pat. No. 9,635,421, each of which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of content and/or data delivery over a content distribution network. More particularly, the present invention is related in one exemplary aspect to apparatus and methods for assuring privacy of collected data related to usage of content delivered to various devices in a content distribution network.

2. Description of Related Technology

Content delivery and distribution networks may have a large number of disparate users. In many situations, it is desirable that the preferences and behaviors of these disparate users be known to the operators of the network (as well as the content sources which generate the content for distribution over the network). Moreover, in cases where the users are subscribers or customers of the delivery network (e.g., as in a cable television, satellite, Hybrid Fiber over Copper (HFCu), or similar network), revenue, profit, and subscriber retention/addition are also critical concerns, since these factors effectively keep the network operator (and to some degree content producers) commercially viable. Accordingly, methods and apparatus are established to generate data records of a subscriber's interaction with content including their preferences, behaviors, etc. Further, billing systems and other support systems may be utilized within such networks in order to further take into account subscription level, access privileges, account status (e.g., payments, delinquency), requests for changes in service, and other related functions associated with the collected records.

The data relating to behaviors, preferences etc. of users in a network may be used, for example, to generate ratings of particular programs (or portions thereof) and statistics across a subsection of subscribers, geographic areas, programs, etc. "Nielsen Ratings" are a well known system of evaluating the viewing habits of cross-sections of the population. When collecting Nielsen ratings, companies use statistical techniques to sample a portion of the population to project a representative national population. Theoretically, the viewing habits of the sample population will substantially mirror the larger population. The companies then measure the populations viewing habits to identify, among other things, what programs the population is watching, as well as the time and frequency at which those programs are watched. This information is then extrapolated to gain insight on the viewing habits of the larger population to determine media consumption. Historically, the Nielsen system has been the primary source of audience measurement information in the television industry. The Nielsen system, therefore, affects various aspects of television including inter alia, advertising rates, schedules, viability of particular shows, etc. Other implementations for the collection of data relating to user interaction with content, however, have also been developed.

The Cable Privacy Act of 1984, and, more generally, privacy and consumer advocacy groups, require (either through specific mandate or threatened action) that without an explicit subscriber opt-in, data that could conceivably be used to trace back to subscriber personally identifiable information be strictly protected, and shared only in such a way as to mitigate the chance that such data could be used to derive subscriber personally identifiable information.

It is appreciated that the collection of such data may not be secure, regardless of any steps taken (such as at the data collection entity) to ensure the anonymity of the subscriber. Problems arise for example, when the sample of data is so small that the particular subscriber(s) to whom the data relates can be determined; i.e., where a party may determine the identity of subscribers via "derivative association". For example, suppose a company has only one customer within a particular zip code. If that company shares "anonymous" information with a third party which includes the zip code, the only additional piece of information that the third party would have to know is who in that zip code is a customer of the company. This information may readily be obtained, such as through buying data from data aggregators such as Experian. With only these two pieces of information, the third party may now uniquely identify the household referred to in the "anonymous" data that the company provided.

The aforementioned logic is also readily extendable to other situations where, although a greater amount of seemingly "anonymous" data is provided to third parties, those parties, through joining the "anonymous" data with information obtained from additional data sources, can derive personally identifiable data.

Hence, what are needed are methods and apparatus for automatically "collapsing" or otherwise adjusting anonymous data sets generated for third parties in such a way as to minimize the probability that, through correlation to other data sources, a third party could associate the provided data to personally identifiable information in order to determine a unique identity of the user to which the data relates.

SUMMARY OF THE INVENTION

The present invention addresses the foregoing needs by disclosing, inter alia, apparatus and methods for ensuring data privacy in a content distribution network.

In a first aspect of the invention, a method for ensuring privacy of transmitted data is disclosed. The data relates, in one embodiment, to the interaction of individual ones of a plurality of subscribers in a content distribution network with content provided over the network. In one variant, the method comprises: receiving a plurality data, the plurality of data relating to interaction of the plurality of subscribers with the content, examining a cardinality of a subset of the plurality of subscribers having a first aspect reflected in respective ones of the individual ones of the plurality of data. If the cardinality meets or exceeds a predetermined threshold, the plurality of data is transmitted, and if the cardinality does not meet or exceed the predetermined threshold, the first aspect of the plurality of data is adjusted, and the adjusted data transmitted.

In another embodiment, the method comprises: receiving a plurality of anonymized data records, each of the plurality of anonymized data records describing interaction of an individual one of a plurality of users with content, the data records each having a plurality of fields, examining a first cardinality of a subset of the plurality of data records with respect to a first one of the plurality of fields, examining a second cardinality of a difference between the subset of the plurality of data records with respect to the first one of the plurality of fields and the plurality of data records, and if either the first or the second cardinality is not within a respective predetermined range, adjusting the first one of the plurality of fields by performing at least one of broadening, replacing or eliminating the first one of the plurality of fields.

In a second aspect of the invention, an apparatus for use in a content distribution network is disclosed. In one embodiment, the apparatus comprises: at least one interface configured to receive a plurality of tuning event records associated with a respective plurality of user devices in the content distribution network, a storage entity, and a data processor, the data processor configured to run at least one computer application thereon, the application configured to, when executed: determine whether a number of the received plurality of tuning event records having a first aspect is within an acceptable range, if the number is greater or less than the acceptable range, adjust a value of the first aspect of the plurality of tuning records, and transmit the plurality of tuning records to a remote entity.

In a third aspect of the invention, system for providing a plurality of data records relating to subscribers' interaction with content provided via a content distribution network is disclosed. In one embodiment, the system comprises a plurality of client devices, each of the plurality of client devices receiving content via the network and generating a plurality of information describing interaction therewith, and a headend entity in communication with the plurality of client devices and configured to receive the plurality of information therefrom. In one variant, the headend entity is further configured to run at least one computer program thereon, the at least one computer program configured to examine the plurality of information to determine whether an identity of an individual one of the client devices may be derived if the plurality of information is provided to an outside party, and if the identity may be derived, executing one or more data privacy enhancement protocols on the plurality of information.

In a fourth aspect of the invention, a computer readable apparatus comprising a storage medium, the medium having at least one program stored thereon is disclosed. In one embodiment, the program is configured to, when executed: access at least one data record relating to a subscribers' interaction with content provided via a content distribution network, examine the at least one record to determine whether an identity of the subscriber or their client device may be derived when the at least one data record is provided to an outside party, and if the identity may be derived, executing one or more data privacy enhancement protocols on the at least one record.

In a fifth aspect of the invention, methods of doing business including the collection and transmission of records describing user interactions with content are disclosed.

In a sixth aspect of the invention, consumer premises equipment (CPE) for operation within a content delivery network and interaction with content provided thereby is disclosed.

In a seventh aspect of the invention, a network apparatus for collection and processing of records describing user interaction with content is disclosed.

In another aspect of the present disclosure, a non-transitory computer-readable apparatus is disclosed. In one embodiment thereof, the computer-readable apparatus includes a storage medium, the storage medium having at least one computer program stored thereon, the at least one computer program including a plurality of instructions configured to, when executed by a processor apparatus, cause a computerized apparatus to: access a data record relating to an interaction of a subscriber of a content distribution network with at least portions of content provided via the content distribution network; evaluate the data record to determine whether a privacy measure is necessary to protect the data record from derivation of user data associated with the subscriber; and responsive to a determination that the privacy measure is necessary, execute a data privacy enhancement protocol on the data record to produce an adjusted data record.

In another aspect of the present disclosure, a computerized apparatus for use in a content distribution network is disclosed. In one embodiment, the computerized apparatus includes: at least one data interface configured to perform data communication with one or more service nodes in the content distribution network; storage apparatus including at least one computer program; and a processor apparatus configured to execute the at least one computer program, the at least one computer program including a plurality of instructions configured to, when executed, cause the computerized apparatus to: cause at least one service node to obtain a plurality of tuning data records; cause the at least one service node to determine whether an privacy measure is necessary to protect the user data from privacy attacks; enable the at least one service node to: responsive to a determination that the privacy measure is necessary, adjust at least a subset of values of the user data, and transmit the adjusted user data to the computerized apparatus; and responsive to a determination that the privacy measure is not necessary, transmit the user data to the computerized apparatus.

In another aspect of the present disclosure, a computerized method of ensuring privacy of data in a content distribution network is disclosed. In one embodiment, the computerized method includes: receiving a plurality of data representative of anonymized data records; algorithmically evaluating the plurality of data representative of anonymized data records to identify a susceptibility to derivative association, the identification being based at least on a cardinality associated with a subset of the data representative of anonymized data records; and in response to the identification of a susceptibility, algorithmically collapsing at least a portion of the subset of the data representative of anonymized data records.

These and other aspects of the invention shall become apparent when considered in light of the disclosure provided herein.

Figure 1:
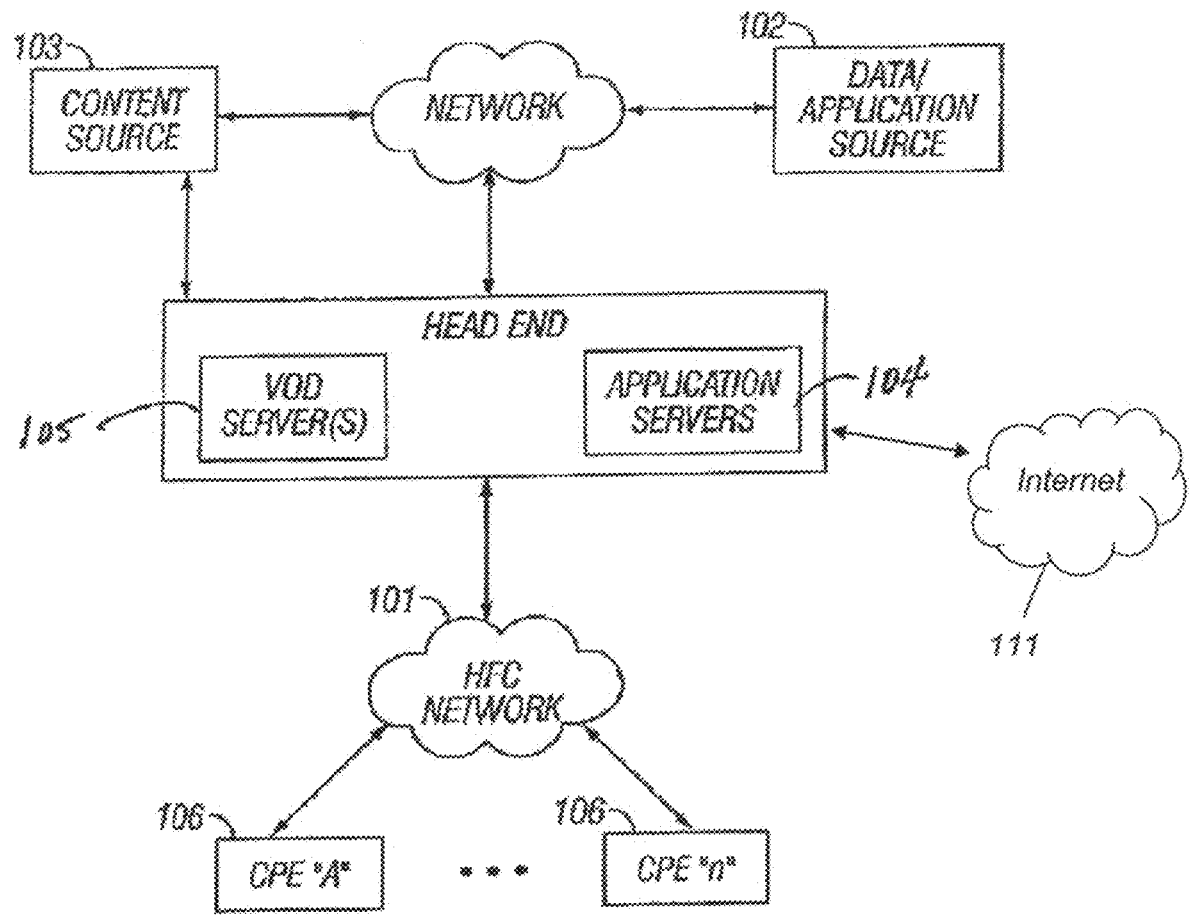
FIG. 1 is a functional block diagram illustrating an exemplary HFC cable network configuration useful with the present invention.

All Figures © Copyright 2010 Time Warner Cable, Inc. All rights reserved.

DETAILED DESCRIPTION OF THE INVENTION

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set top boxes (e.g., DSTBs), personal computers (PCs), and minicomputers, whether desktop, laptop, or otherwise, and mobile devices such as handheld computers, PDAs, personal media devices (PMDs), and smartphones.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The terms "Customer Premises Equipment (CPE)" and "host device" refer without limitation to any type of electronic equipment located within a customer's or user's premises and connected to a network.

As used herein, the term "display" means any type of device adapted to display information, including without limitation CRTs, LCDs, TFTs, plasma displays, LEDs, incandescent and fluorescent devices, or combinations/integrations thereof. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11a,b,g,n), WiMAX (802.16), PAN (e.g., 802.15), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation, any of the variants of IEEE-Std. 802.11 or related standards including 802.11a/b/g/n/v.

As used herein, the term "wireless" means any wireless signal, data, communication, or other interface including without limitation Wi-Fi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

The present invention discloses, inter alia, methods and apparatus for ensuring the privacy of the identity of the subscribers, users, and/or devices in a content delivery network from which data is collected and distributed. Interaction of users with content is recorded in one embodiment via the collection of tuning records. However, as noted above, it is often vital that the identity (or privacy) of the users and/or their devices be maintained. Hence, the architecture and methods described herein provide a protocol for adjusting information within the tuning records collected from the devices (e.g., such as by broadening or generalizing the data) so that these may not be used to derive an identity of a user and/or device. Although the root tuning records may be anonymized, they may still be susceptible to a determination of the identity thereof by derivative association or other techniques. The present methods and apparatus in one embodiment: (i) determine whether the number of provided records is comparatively small, thus creating an opportunity for derivative association with respect to the provided records, (ii) determine whether the number of provided records is comparatively large, thus creating an opportunity for derivative association with respect to the records which were not provided, and (iii) if it is determined that the records are comparatively too large or comparatively too small, collapsing or adjusting at least portions of the data. The determination of whether the number of provided records is improperly large or small in one embodiment utilizes an algorithm for determining, for each aspect described in the records, a cardinality of the group of records with respect to that aspect. Hence, tuning records may be collected regarding the users' interaction with content in the network without exposing the data to privacy attacks, such as by derivative association.

In one embodiment, the collapse or adjustments to the data within the tuning records comprises removing a first data value and replacing it with a second data value descriptive of the first data value. For example, a particular zip code may be replaced with a city or state to which the zip code relates. In another embodiment, the data may be collapsed by increasing a range for the value of the aspect. For example, if the value of the aspect is an age range from 20-25, the range may be increased to 20-30. Data may further be adjusted by generalizing the value of the aspect. For instance, the value listing a specific device model number may be generalized instead disclose the type of device that particular model is (e.g., HD, DVR, etc.). The data may be likewise collapsed by removal of the aspect all together.

Further processing of the collected tuning records may include, inter alia, validating the data (to ensure the reliability thereof), determining and accounting for latency, generating reports which filter the data, etc.

The herein described data collapse (and optional processing) may occur at e.g., a headend entity, a local service node, or at the user device itself. Furthermore, the collapsed (and processed) records may be provided to a data analyzing entity either within the MSO network, or remote thereto. It is appreciated that any number of architectures and topologies may implement the herein described methods and apparatus.

Business models and rules for the implementation of the aforementioned methods and for the identification of a need for enhanced privacy measures with respect to data relating to a user's interaction with content, and the implementation thereof are also described.

Detailed Description of Exemplary Embodiments

Exemplary embodiments of the apparatus and methods of the present invention are now described in detail. While these exemplary embodiments are described in the context of use with the aforementioned hybrid fiber (e.g., HFC) terrestrial delivery system or satellite network architecture having an multiple systems operator (MSO), digital networking capability, IP delivery capability, and plurality of client devices/CPE, the general principles and advantages of the invention may be extended to other types of networks and architectures, whether broadband, narrowband, wired or wireless, or otherwise, the following therefore being merely exemplary in nature. For instance, the invention may be adapted for use on so-called hybrid fiber copper (HFCu) networks, or WiMAX (IEEE Std. 802.16) wireless networks.

It will also be appreciated that while described generally in the context of a consumer (i.e., home) end user domain, the present invention may be readily adapted to other types of environments (e.g., commercial/enterprise, government/ military, etc.) as well. Myriad other applications are possible.

Other features and advantages of the present invention will immediately be recognized by persons of ordinary skill in the art with reference to the attached drawings and detailed description of exemplary embodiments as given below.

Network—

FIG. 1 illustrates a typical content delivery network configuration with which the apparatus and methods of the present invention may be used. The various components of the network 100 include (i) one or more data and application origination points 102; (ii) one or more content sources 103; (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. The headend is also connected through a gateway or other such interface (not shown) to unmanaged external internetworks such as the Internet 111. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the architecture of FIGS. 1a-1c (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104.

Although not illustrated, a typical network headend 150 may further include e.g., various billing entities, subscriber management systems, cable modem termination system (CMTS)

It will also be appreciated that the network configuration depicted in FIG. 1 is high-level, conceptual architecture and that each MSO may have multiple headends deployed using custom architectures.

The exemplary headend 150 may further include a multiplexer-encrypter-modulator (MEM) adapted to process or condition content for transmission over the network. As previously described, information is carried across multiple channels. Thus, the headend 150 is adapted to acquire the information for the carried channels from various sources. Typically, the channels being delivered from the headend 150 to the CPE 106 ("downstream") are multiplexed together in the headend, as previously described and sent to neighborhood hubs (FIG. 1b) via a variety of interposed network components.

It will also be recognized, however, that the multiplexing operation(s) need not necessarily occur at the headend 150 (e.g., in the aforementioned MEM). As one alternative, a multi-location or multi-stage approach can be used, such as that described in U.S. Pat. No. 7,602,820, entitled "APPARATUS AND METHODS FOR MULTI-STAGE MULTIPLEXING IN A NETWORK" incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed-back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0 (and subsequent) specification provides for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

Figure 1A:
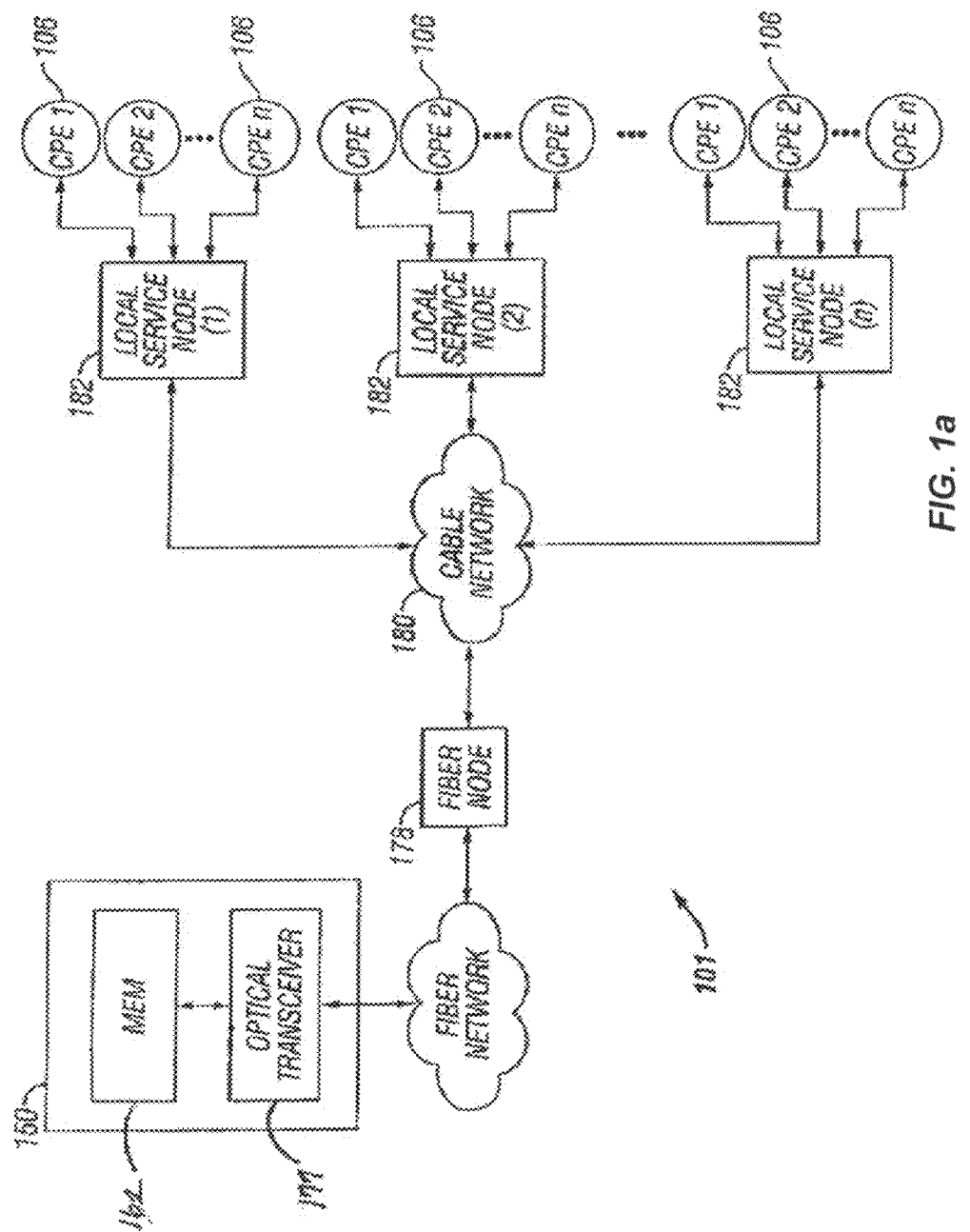
FIG. 1a is a functional block diagram illustrating one exemplary local service node configuration useful with the present invention.

In addition to on-demand and broadcast content (e.g., video programming), the system of FIGS. 1 and 1a (and 1b and 1c discussed below) also deliver Internet 111 data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels, such as via a multiplexed transport stream (MPTS). In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast. Delivery of the IP-encapsulated data may also occur over the non-DOCSIS QAMs, such as described below with respect to FIG. 1c.

The CPE 106 are each configured to monitor the particular assigned RF channel (such as via a port or socket ID/address, or other such mechanism) for IP packets intended for the subscriber premises/address that they serve.

"Switched" Networks—

Figure 1B:
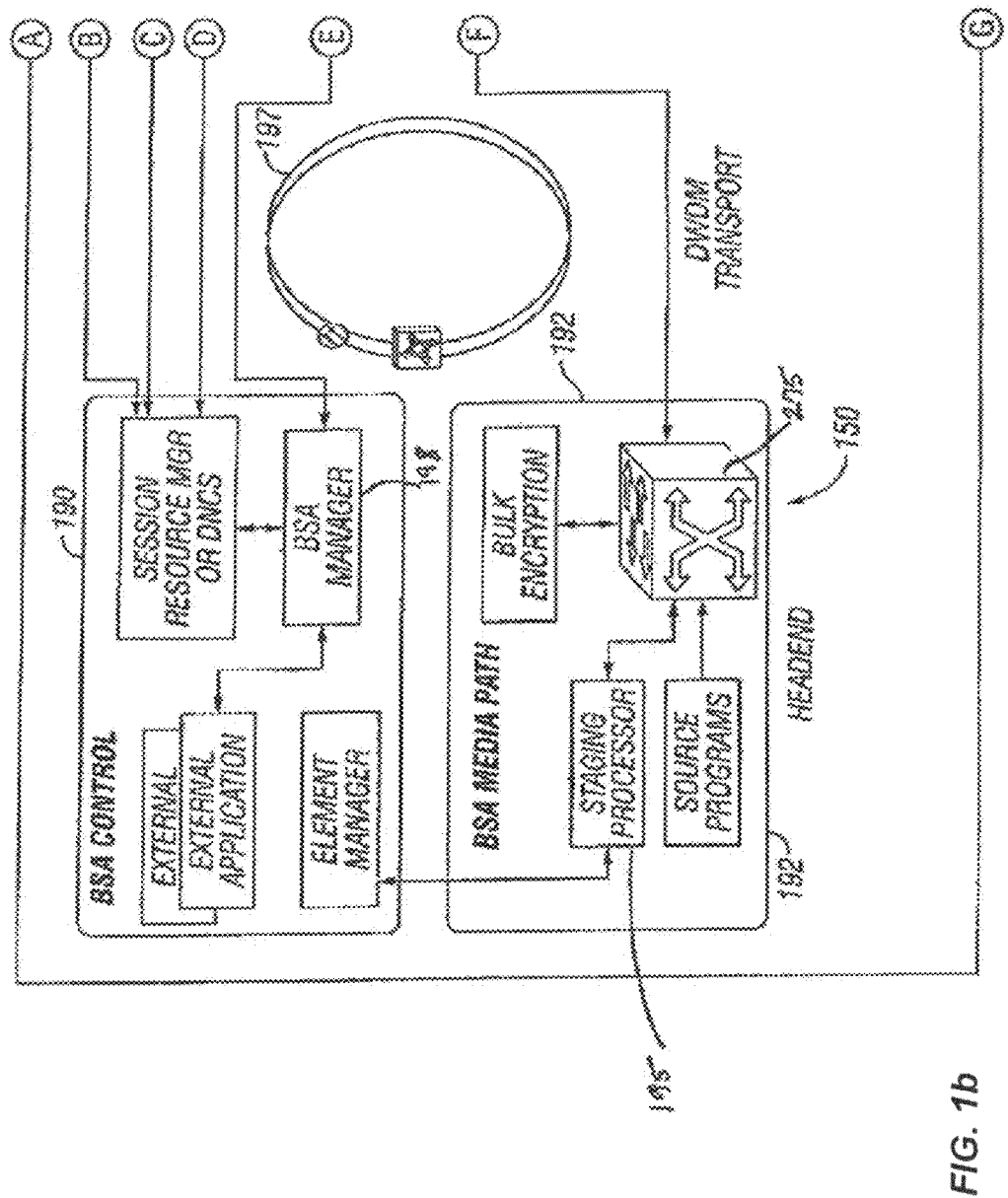
FIG. 1b is a functional block diagram illustrating one exemplary broadcast switched architecture (BSA) network useful with the present invention.
Figure 1B:
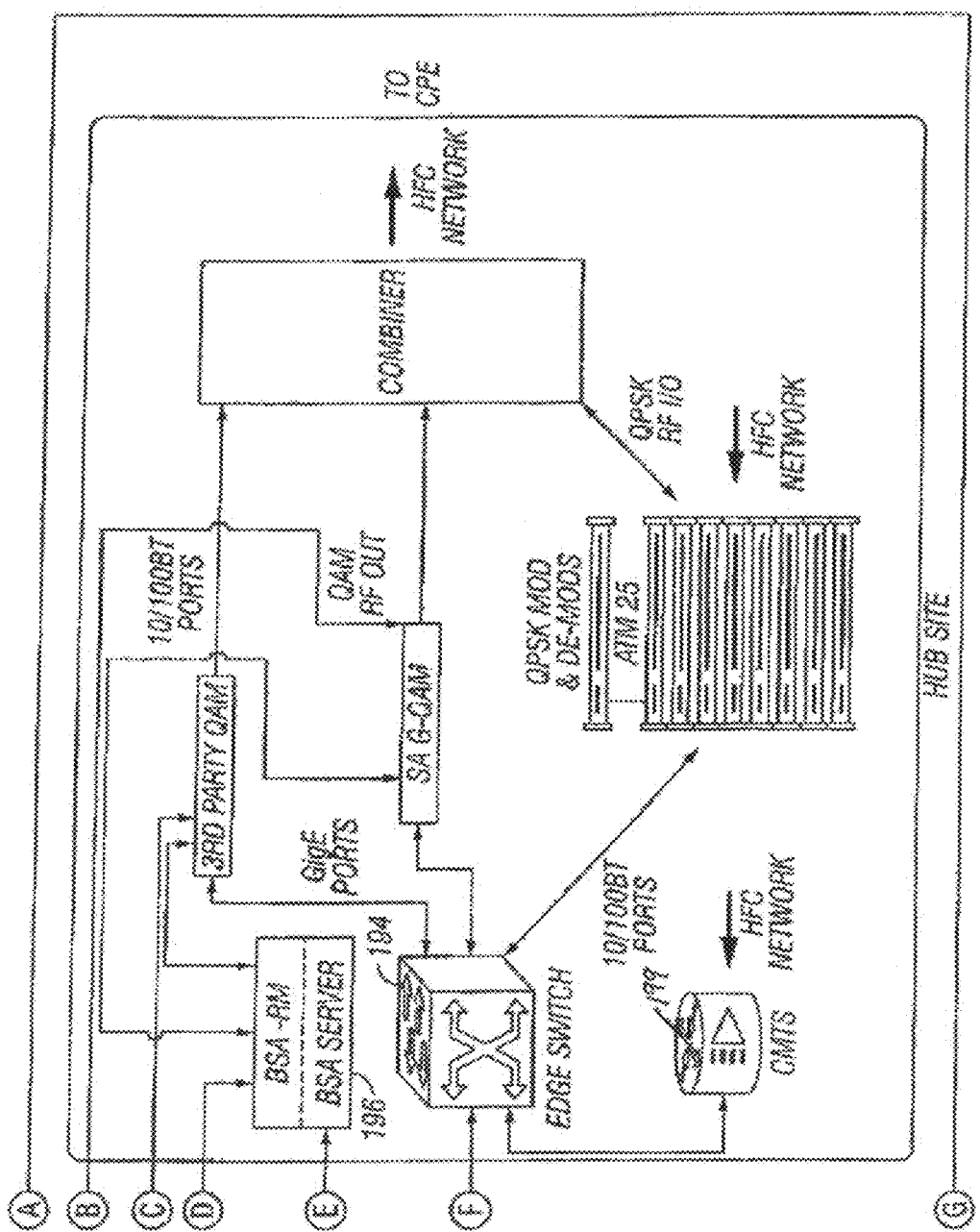

FIG. 1b illustrates an exemplary "switched" network architecture also useful with the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber is unaware of any difference between programs delivered using a switched network and ordinary streaming broadcast delivery.

FIG. 1b shows the implementation details of one exemplary embodiment of this broadcast switched network architecture. Specifically, the headend 150 contains switched broadcast control and media path functions 190, 192, these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned U.S. patent application Ser. No. 09/956,688 filed Sep. 20, 2001 and entitled "TECHNIQUE FOR EFFECTIVELY PROVIDING PROGRAM MATERIAL IN A CABLE TELEVISION SYSTEM", now U.S. Pat. No. 8,713,623, incorporated herein by reference in its entirety, describes one exemplary broadcast switched digital architecture useful with the present invention, although it will be recognized by those of ordinary skill that other approaches and architectures may be substituted.

Referring again to FIG. 1b, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels that are different than the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

"Packetized" Networks—

Figure 1C:
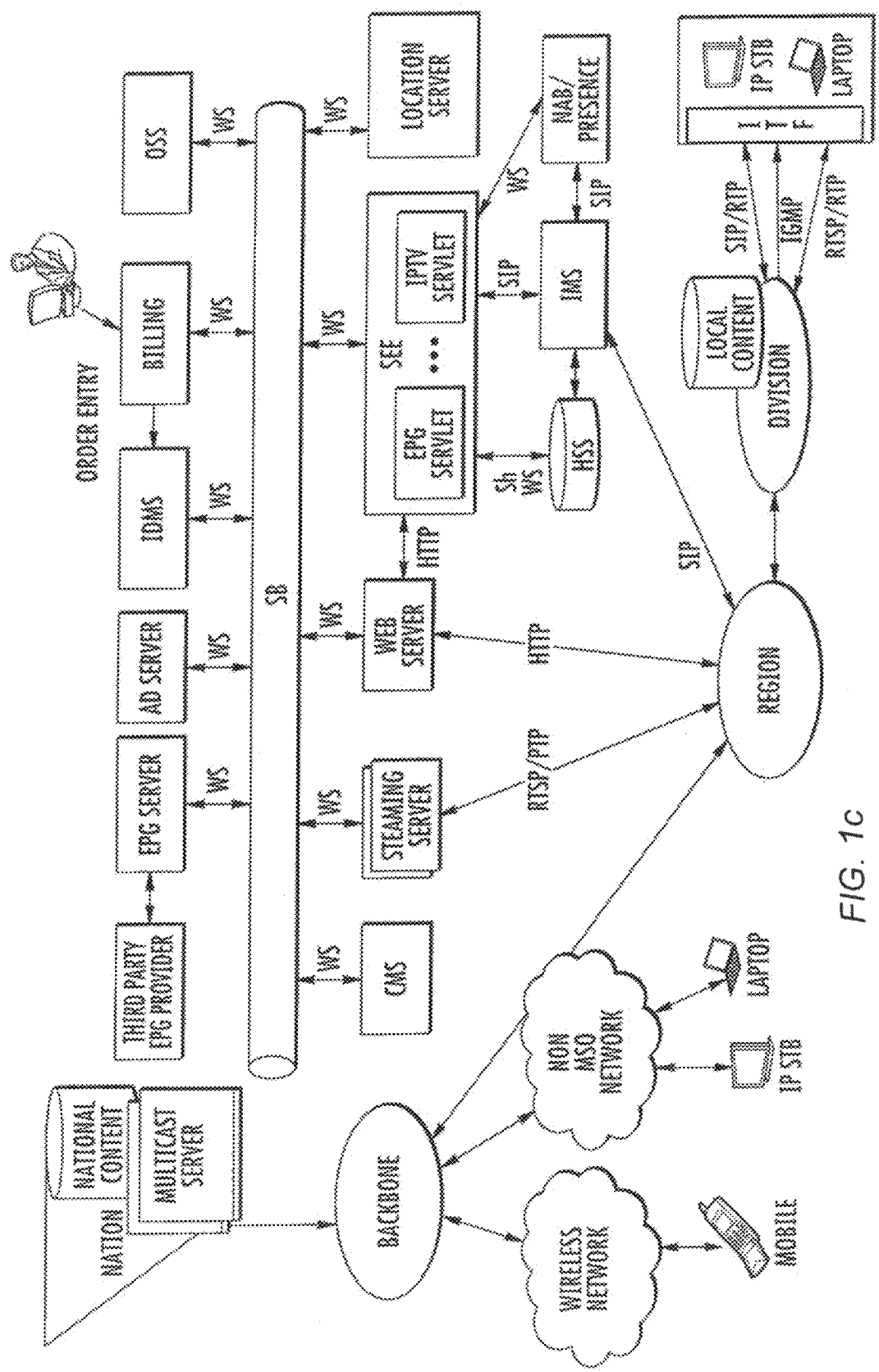
FIG. 1c is a functional block diagram illustrating one exemplary packetized content delivery network architecture useful with the present invention.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the present invention, a "packet optimized" delivery network is used for carriage of the packet content (e.g., IPTV content) when the request issues from an MSO network (see discussion of FIG. 2a below). FIG. 1c illustrates one exemplary implementation of such a network, in the context of an IMS (IP Multimedia Subsystem) network with common control plane and service delivery platform (SDP), as described in co-pending U.S. Provisional Patent Application Ser. No. 61/256,903 entitled "METHODS AND APPARATUS FOR PACKETIZED CONTENT DELIVERY OVER A CONTENT DELIVERY NETWORK", incorporated herein by reference in its entirety. Such a network provides significant enhancements in terms of common control of different services, implementation and management of content delivery sessions according to unicast or multicast models, quality-of-service (QoS) for IP-packetized content streams, service blending and "mashup", etc.; however, it is appreciated that the various features of the present invention are in no way limited to any of the foregoing architectures.

Data Privacy Architecture—

Figure 2A:
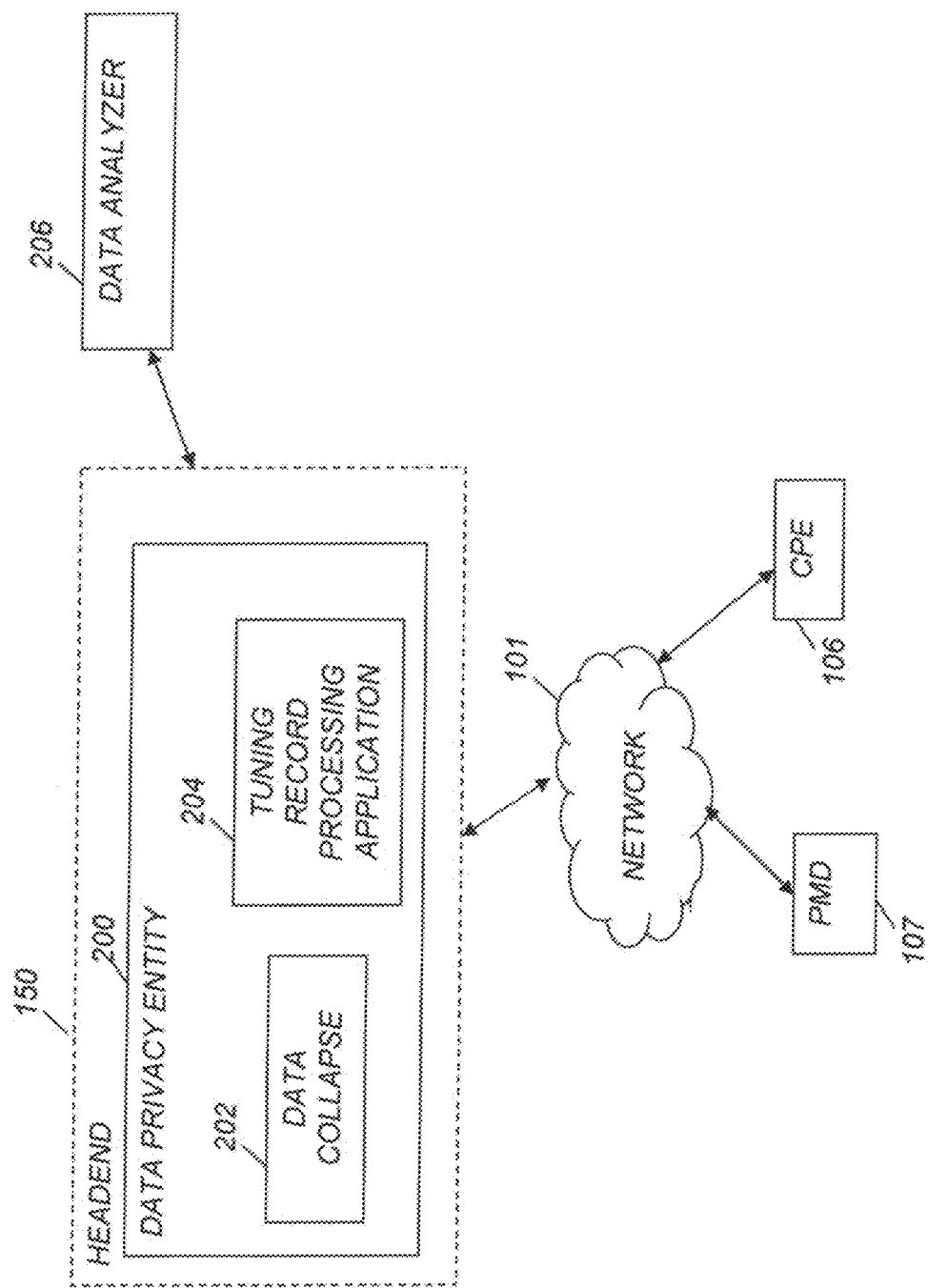
FIG. 2a is a functional block diagram illustrating a first embodiment of a data privacy architecture configured in accordance with the present invention.

Referring now to FIG. 2a, a high-level block diagram of a data privacy architecture configured in accordance with one embodiment of the invention is illustrated. The architecture of FIG. 2a generally provides a mechanism whereby the privacy of data which is provided to other entities (such as e.g., the data analyzer 206) is ensured.

As discussed above, content (such as movies, advertisements, data, applications, games, binary images, etc.) is provided to a plurality of user devices via a content distribution network. Users of the user devices interact with the content, such as by tuning in to or away from a particular station, channel, program etc., tuning out, and/or initiating trick mode operations (e.g., fast forward, rewind, pause, stop, etc.). "Tuning" records are created to describe the various users' interactions with the provided content. As used herein, tuning records refer without limitation to a collection of data files, each file containing information regarding a particular user's usage and interaction with particular content and/or data. It is also noted that the term "tuning records" is in no way limited to tuning events; other types of interactions are contemplated for use with the present invention as well, such as interaction with so-called "telescoping" advertisements, initiation of executable files, interaction with games, etc.

The tuning records utilized in the exemplary embodiment of the invention may comprise a plurality of types of data. For example, records may be collected relating to: (i) requests to receive specific content elements (e.g., movie, game, etc.) at particular devices such as CPE 106, PMD 107, etc. (e.g., "tune in" events), (ii) the number of times the content element is requested, (iii) other events or functions such as "trick mode" operations employed with respect to content including e.g., fast forward, rewind, pause, play, etc., (iv) requests to terminate viewing of specific content elements (e.g., "tune away" events), and/or (v) requests to terminate viewing altogether (e.g., "tune out" events), etc. This data may be analyzed with respect to the requesting devices, including e.g., the frequency requests for certain types of programming, the subscriber associated to the device, group of subscribers, devices, households, geographic or demographic areas, etc. Note that in certain variants, the records may aggregate data from multiple events; e.g., a request for the content, a tune in, and a tune out.

The tuning records (i.e., data regarding the user's interaction with content) may include interaction with at least portions of various different types or delivery modes of content. For example, data may be collected regarding the users interaction with linear and/or switched digital broadcast content, VOD/MVOD/FVOD (or other type of on-demand content), content from a personal video recorder (PVR) or digital video recorder (DVR), whether local to the premises or network-based, IPTV content, etc. Further, the requested/provided content may comprise, for example, so-called "quick clips" content (described in co-owned U.S. Pat. No. 7,174,126 issued Feb. 6, 2007 and entitled "TECHNIQUE FOR EFFECTIVELY ACCESSING PROGRAMMING LISTING INFORMATION IN AN ENTERTAINMENT DELIVERY SYSTEM" incorporated herein by reference in its entirety), so-called "start-over" content (described in co-owned, co-pending U.S. Patent Publication No. 2005/0034171 entitled "TECHNIQUE FOR DELIVERING PROGRAMMING CONTENT BASED ON A MODIFIED NETWORK PERSONAL VIDEO RECORDER SERVICE" incorporated herein by reference in its entirety), so-called "lookback" content (as described in co-owned, co-pending U.S. patent application Ser. No. 10/913,064 filed Aug. 6, 2004 and entitled "TECHNIQUE FOR DELIVERING PROGRAMMING CONTENT BASED ON A MODIFIED NETWORK PERSONAL VIDEO RECORDER SERVICE" incorporated herein by reference in its entirety), and/or so-called "remote DVR" content (as discussed in co-owned U.S. Pat. No. 7,457,520 issued Nov. 25, 2008 and entitled "TECHNIQUE FOR PROVIDING A VIRTUAL DIGITAL VIDEO RECORDER SERVICE THROUGH A COMMUNICATIONS NETWORK" incorporated herein by reference in its entirety).

Still further, enhanced access to premium content which is not available to non-subscribers or which cannot be delivered across traditional transport may also be provided, such as e.g., behind the scenes outtakes, alternate endings, actor interviews, etc. and data collected relating thereto as well. In yet a further embodiment, the content may comprise interactive content such as that described in co-owned U.S. patent application Ser. No. 12/582,619 filed Oct. 20, 2009 and entitled "GATEWAY APPARATUS AND METHODS FOR DIGITAL CONTENT DELIVERY IN A NETWORK", now U.S. Pat. No. 9,027,062, and in co-owned U.S. patent application Ser. No. 12/582,653 filed Oct. 20, 2009 and entitled "METHODS AND APPARATUS FOR ENABLING MEDIA FUNCTIONALITY IN A CONTENT-BASED NETWORK", now U.S. Pat. No. 8,396,055, each of which is incorporated herein by reference in its entirety.

The architecture illustrated in FIG. 2a generally comprises a network headend 150, including a data privacy entity 200. The data privacy entity 200 is in communication with a plurality of user devices or customer premises equipment (CPE) 106, which may include, inter alia, personal media devices (PMDs) 107, laptop and personal computers (PCs), set top boxes (STBs), digital video recorders (DVRs), etc., via the network 101. The data privacy entity may comprise a software process running on an extant device (e.g., headend server or third party server). The data privacy entity is configured to run one or more algorithms for protecting the privacy of users and/or devices from which information (such as tuning event records) is collected.

The CPE 106 in one embodiment comprises a gateway device such as that discussed in co-owned U.S. patent application Ser. No. 11/818,236 filed Jun. 13, 2007 and entitled "PREMISES GATEWAY APPARATUS AND METHODS FOR USE IN A CONTENT-BASED NETWORK", now U.S. Pat. No. 7,954,131, which is incorporated herein by reference in its entirety. As discussed therein, the gateway acts as a unified proxy for all inbound (downstream) and outbound (upstream) communications with a network. In this way, various user devices within a premises may receive data and content via the gateway apparatus.

In another embodiment, the CPE 106 comprises a media bridge apparatus such as that discussed in co-owned U.S. patent application Ser. No. 12/480,597 filed Jun. 8, 2009 and entitled "MEDIA BRIDGE APPARATUS AND METHODS", now U.S. Pat. No. 9,602,864, incorporated herein by reference in its entirety. As discussed therein, the CPE 106 may act as a connection between a portable media device (PMD) and a user's home network. Hence, the aforementioned tuning records may be collected regarding not only the CPE 106 itself, but also any connected devices.

The network data privacy entity 200 is configured to run at least a data collapse process 202 and a tuning record processing application 204 thereon. Although illustrated and described as comprising software running on a processor of the data privacy entity 200 (e.g., a server), it is appreciated that these processes 202, 204 may alternatively take the form of a hardware device or logic, combination of hardware and software, or any other form suitable to achieve the desired degree of automation and processing. Likewise, one or more of the aforementioned processes 202, 204 may be located at a different entity, whether at the headend 150 or elsewhere (even to include the CPE itself, such as where each CPE includes a process or application or middleware configured to process tuning event records). It is further appreciated that the data privacy entity 200 may be physically located at any other location whether within the network 101 or in a separate network (not shown) in communication therewith.

The tuning record processing application 204 may be used, in one embodiment, to cause tuning records to be generated regarding user interaction with content occurring at the CPE 106. The tuning record generation may occur at: (i) the processing application 204 itself, such as by using "raw" interaction data received from the CPE; (ii) at the CPE 106, or (iii) at another entity, such as e.g., an intermediary entity which aggregates data from two or more sources, and packages it appropriately. When generated at the CPE or other intermediary entity, these records are passed to the network data privacy entity 200, which collects and validates them via the tuning record processing application 204. The tuning record processing application 204 may further process the tuning records by identifying and characterizing network and/or device latencies. Still further, the tuning record processing application 204 may be utilized to generate one or more reports relating to the collected records. These and other functions of the data privacy entity 200 will be discussed in greater detail below.

In one embodiment, the tuning record processing application 204 may be of the type discussed in co-owned U.S. patent application Ser. No. 12/944,648 filed on Nov. 11, 2010 and entitled "APPARATUS AND METHODS FOR IDENTIFYING AND CHARACTERIZING LATENCY IN A CONTENT DELIVERY NETWORK", now U.S. Pat. No. 8,930,979, previously incorporated herein. As discussed therein, the network entity 200 may further be adapted to take into account network and device specific latency and adjust tuning records accordingly. In another embodiment, the apparatus and methods of co-owned U.S. patent application Ser. No. 12/877,062 filed on Sep. 7, 2010 and entitled "METHODS AND APPARATUS FOR AUDIENCE DATA COLLECTION AND ANALYSIS IN A CONTENT DELIVERY NETWORK", now U.S. Pat. No. 9,635,421, previously incorporated herein, may be utilized for providing tuning record generation and collection.

In a further embodiment, the tuning record processing application 204 may utilize the methods and apparatus of co-owned U.S. patent application Ser. No. 12/829,104 filed on Jul. 1, 2010 and entitled "APPARATUS AND METHODS FOR DATA COLLECTION, ANALYSIS AND VALIDATION INCLUDING ERROR CORRECTION IN A CONTENT DELIVERY NETWORK", now U.S. Pat. No.

8,484,511, previously incorporated herein, for data validation as discussed herein below.

The aforementioned tuning records are, in one embodiment, anonymized using the methods and apparatus disclosed in U.S. patent application Ser. No. 12/877,062, now U.S. Pat. No. 9,635,421, previously incorporated herein. Alternatively, a cryptographic hash (e.g., MD5, SHA1, SHA2, HMAC) may be utilized to disguise the subscriber identity and/or CPE 106 identity. In one embodiment, the techniques for providing anonymity utilizing a cryptographic hash described in U.S. patent application Ser. No. 11/186,452 filed Jul. 20, 2005 and entitled "METHOD AND APPARATUS FOR BOUNDARY-BASED NETWORK OPERATION", which is incorporated herein by reference in its entirety, may be utilized in conjunction with the present invention to provide the desired hash.

As discussed in greater detail below with respect to FIGS. 3, 4 and 5a-5d, the data collapse entity 202 is responsible for determining whether individual ones of the tuning records may utilize additional adjustments to ensure data privacy. That is to say, the tuning records received at the network data privacy entity 200 are anonymized; however, in many instances this anonymization is not sufficient to provide the level of anonymity desired by the situation, or required by e.g., the Cable Privacy Act, etc. Hence, the data collapse entity 202 helps ensure that a subscriber's identity may not be detected, including by e.g., derivative association, by collapsing the data via one or more collapsing methods (see e.g., FIGS. 5a-5d). Once collapsed, the identity of the subscribers cannot be derived, and thus the tuning records may be transmitted to other entities.

The data in the architecture of FIG. 2a is transmitted to a data analyzer 206. In the illustrated embodiment, the data analyzer 206 is located outside of the MSO network 101 of FIG. 1; however, it is appreciated that the data analyzer 206 may be physically located literally anywhere including e.g., remote to the network 101, at a different or non-MSO network, and/or within the illustrated network 101. The data analyzer 206 may also be associated with a particular content provider or advertiser, or alternatively unaffiliated or acting on behalf of multiple parties. The data analyzer 206 analyzes the tuning records received from the data privacy entity 200. In many instances the tuning records are analyzed to determine patterns of behavior, viewership statistics or ratings, market penetration for advertisements, etc.

It is appreciated that the records may be provided thereto in the form of a report, whereby only selected ones of the entirety of collected records are provided to individual ones of a plurality of analyzer entities 206, each of the entities 206 (not shown) being associated with a different third party. For example, an analyzer 206 for a specific advertiser may be provided with tuning records relating only to users' interaction with the advertisements of that advertiser, and so forth. In another example, a programming content provider analyzer 206 may receive tuning records relating to all programming from that provider, programming during certain times (e.g., primetime, etc.), and/or from specific users (such as by demographic, geographic location, etc.). As noted above, the tuning record processing application 204 is configured to filter all the tuning records to generate reports with the aforementioned tuning records.

Figure 2B:
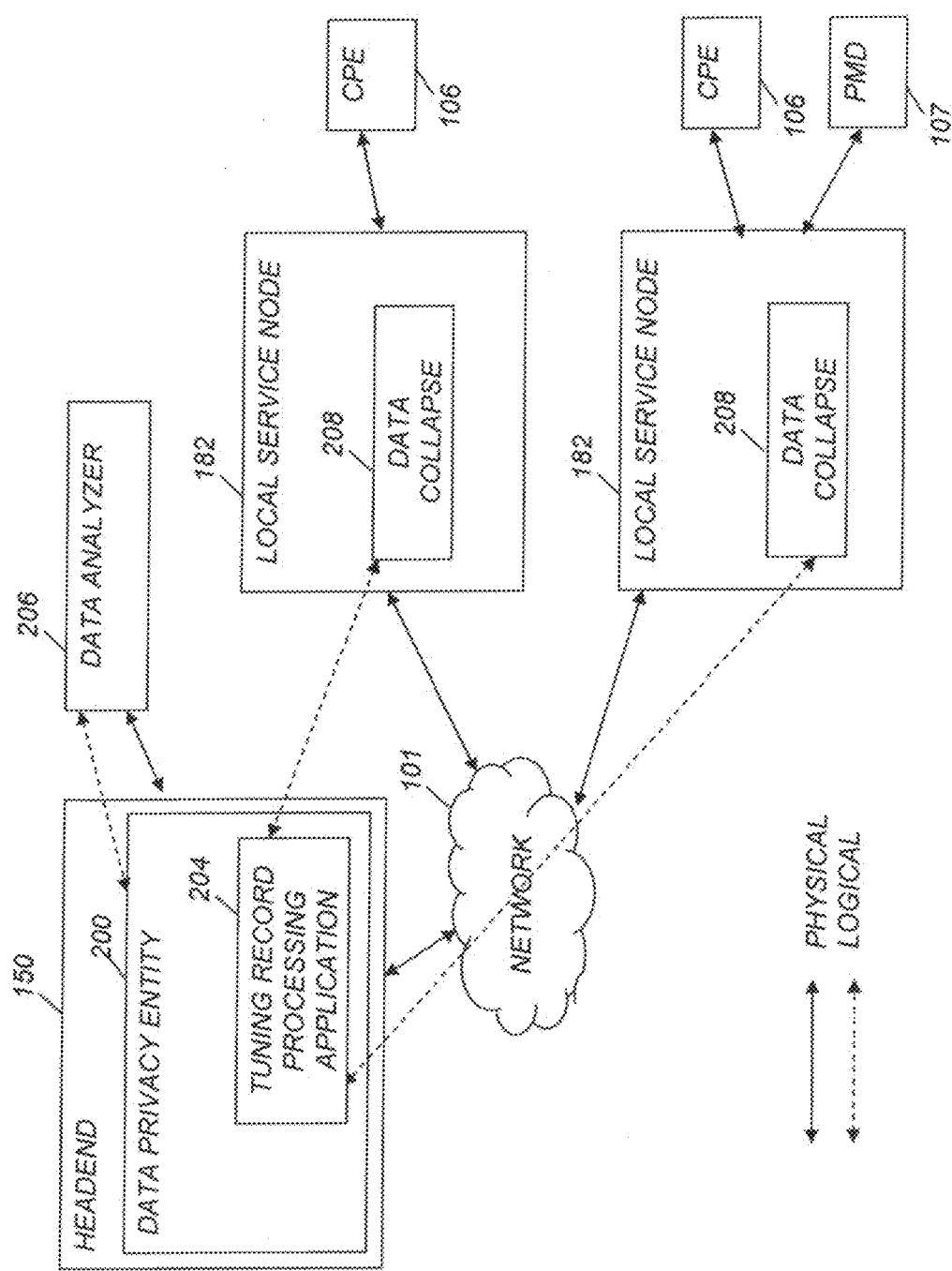
FIG. 2b is a functional block diagram illustrating a second embodiment of a data privacy architecture configured in accordance with the present invention.

Referring now to FIG. 2b, another embodiment of a data privacy architecture according to the invention is shown. In the embodiment of FIG. 2b, one or more functions of the network data privacy entity 200 may be placed further towards or even at the "edge" of the network. An edge data collapse application 208 is utilized to perform the data collapse described herein, which were previously discussed as being performed at the network data privacy entity 200. The edge data collapse application 208 performs a data collapse (where necessary) to all tuning records at the local service node 182, then transmits these to the tuning record processing application 204 of the network data privacy entity 200 for collection, validation, latency compensation, reporting, etc.

In the illustrated embodiment, the remaining functions (e.g., collection validation and reporting) are performed at the network data privacy entity 200, as in the architecture of FIG. 2a. However, it is appreciated that these and other functions may be performed elsewhere, such as at the service node 182 as well. In other words, although not pictured, the tuning record processing application 204 may also be placed at the network edge (e.g., the local service node 182), or even distributed onto CPE as described elsewhere herein.

In another embodiment, rather than comprising separate entities, the functionality or processes 202, 204 of the network data privacy entity 200 are implemented as a series of distributed application portions located across various entities in the network.

Figure 2C:
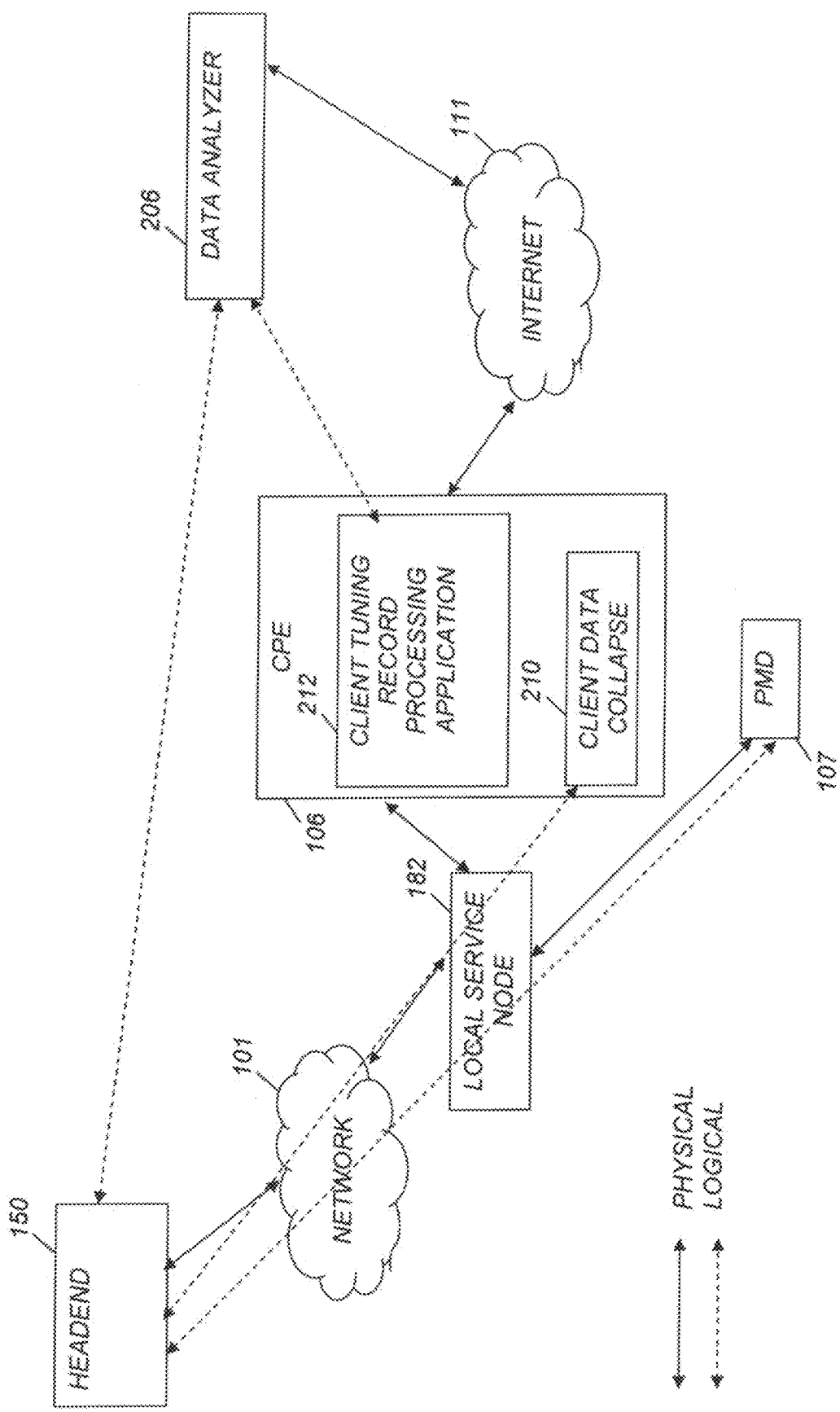
FIG. 2c is a functional block diagram illustrating a third embodiment of a data privacy architecture configured in accordance with the present invention.

FIG. 2c illustrates yet another embodiment of an architecture for ensuring data privacy according to the invention. In this embodiment, the user device (such as e.g., CPE 106, PMD, STB, etc.) is configured to include a client tuning record processing application 212 as well as a client data collapse application 202. Hence, according to this implementation, the CPE 106, via the client tuning record processing application 212, processes the tuning records to e.g., validate, account for latency, and/or report the tuning records to a data analyzer 206 or other designated processing entity. According to this embodiment, the CPE 106 may be responsible for the aforementioned anonymization of tuning records. For example, prior to reporting the tuning records to that data analyzer 206, the CPE 106 may, via the client data collapse application 210, receive signals indicating whether the data should be further collapsed or adjusted (as discussed below with respect to FIGS. 5a-5d). In one exemplary configuration, a data collapse application running at either the headend 150 (such as the data collapse process 202 of the data privacy entity 200) and/or a data collapse application running at the service node 182 determines whether data collapse may be utilized to ensure the privacy of the tuning records generated at the CPE 106. If it is determined that additional privacy measures are needed, at least one of these entities informs the CPE 106 as to this determination. The CPE 106, via the client data collapse application 210, then adjusts or collapses the tuning records before sending the records to the data analyzer 206.

According to this embodiment, the network and/or local node data collapse entities make the aforementioned determination regarding whether to collapse or adjust the data based at least in part on information received from CPE 106 in the network. This information can include for example a "test" record generated by the client application 210; e.g., one which is representative of and populated as it would be under actual use, yet with fictitious values. This test record is then received and analyzed by the network data collapse entity to determine if actual records of the same type would benefit from modification. Note that this test message functionality can be implemented according to any number of different schemes, such as for example: (i) once at the beginning of a user session (e.g., startup of the CPE); (ii) periodically (e.g., every X minutes); (iii) on each proposed record type change (e.g., if records of different types or lengths are to be sent from the CPE to the network entity, any proposed record having a change in type or length would be temporarily buffered or held at the CPE (or not generated yet), and a new test message of that same type generated and issued to the network for analysis before the actual message is sent); or even (iv) before each actual record is sent or generated.

It is further noted that when using the aforementioned test message approach, not all CPE that will be issuing records need send a test message. For example, in one implementation, so long as the record type/constitution is known (such as through use of controlled, uniform classes of records), a test message from one or a subset of all the CPE can be used as the basis of the analysis, with the assumption that similar type records from other CPE will be comparable.

In other variants, the determination regarding whether to collapse or adjust the data can be based at least in part on information received a posteriori by the CPE (or passed to the CPE by an intermediate entity) that is generated by a network, third-party, or external entity. For example, end-user or analyzer feedback can be used as an input to the client collapse application 210 to determine if modification of the records is beneficial, much as receiver bit error rate (BER) feedback is used in wireless networks to adjust transmission/encoding parameters at a transmitter. Specifically, in one variant, the "error rate" (here, loosely defined as the need for modification or adjustment of a record or record type based on the degree of privacy exposure or vulnerability) is determined by a receiver through use of an algorithm which attempts to determine user identity or other information which is not desired to be exposed, and based on this determination, communicates directly or indirectly with the CPE 106 (application 210) to adjust its data collapse parameters.

In yet another implementation, the CPE 106 can be fully functioned with the logic or intelligence to decide a priori whether data should be collapsed or otherwise modified indigenously, such as via an algorithm running on the CPE or within its middleware that applies predetermined rule sets to the records to ensure that they meet prescribed criteria for privacy. These rule sets can also in one variant be periodically updated via downloads from the network (e.g., entities 200 or 206).

FIG. 2c further illustrates that in this embodiment, the CPE 106 is in communication with the data analyzer 206 via the Internet 111. The CPE 106 reports the processed (e.g., normalized, validated and optionally pre-analyzed) and collapsed tuning records to the data analyzer 206 via the Internet 111. However, it is appreciated that communication of the tuning records (or reports or subsets thereof) to the data analyzer 206 may alternatively be accomplished via a headend intermediary or gateway, or yet other means such as a broadband communication channel.

The communication between the CPE 106 and the data analyzer 206 occurs via any number of different modes such as e.g., via IP packets carried over the Internet 111 (as illustrated). In one implementation, this communication "piggybacks" or extends an existing protocol for the transmission of data such as FTP or UDP, although a dedicated protocol specifically for this purpose may be used as well. The user devices communicate data to and from the Internet 111 via literally any wired (e.g., Ethernet, DSL, cable, fiber, and optical wireline connections) or wireless (e.g., Wi-Fi, WiMAX, WAN, PAN, MAN) networking standard.

The embodiment of FIG. 2c may be useful, for example, in a network where there is not two-way communication between the content delivery network (e.g., headend 150) and the user devices (e.g., CPE 106, PMD 107, etc.). In other words, content is delivered via the aforementioned delivery network 101 as well as control messages for the management of the CPE data processing and collapse applications. The processed and collapsed tuning records are collected and transmitted via e.g., a so-called "over the top" IP backhaul to the data analyzer 206. Alternatively, broadband, DSL, or dial-up backhauls from the target premises may be utilized to transmit tuning or other useful information to a data analyzer 206 (e.g., a third party website). The data may be transmitted directly to an entity associated with the content delivery network or operator (e.g., MSO) rather than a third party, and/or the data analyzer 206 may communicate the information back to the MSO headend. The data analyzer 206 collects the processed tuning records and analyzes them, or may send the data back to the MSO (or store the data first, and sends it up to the MSO at a later time). An entity of the MSO may then utilize the information provided to it to generate the aforementioned CPE processing and collapse control messages, thereby enabling the CPE to process and collapse data via upstream communication from the CPE to the headend.

In yet another embodiment, the tuning record processing functionality may remain at the network (as discussed above with respect to FIG. 2a), the data collapse functionality remaining at the client device. This architecture further simplifies processing at the network, as the records which are collected there are already sufficiently anonymized and privatized, thereby obviating the need for the network having to perform any anonymization/privatization steps. The network is therefore only used to process the records.

Data Privacy Methodology—

Figure 3:
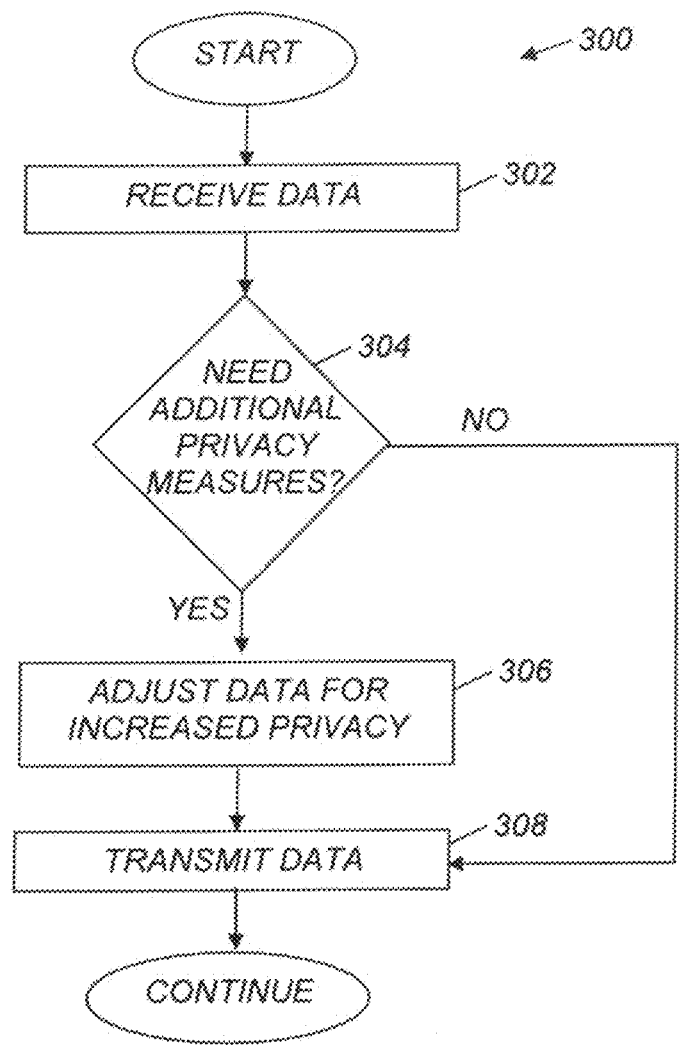
FIG. 3 is a logical flow diagram illustrating an exemplary embodiment of the generalized method for ensuring data privacy according to the present invention.

FIG. 3 illustrates an exemplary embodiment of the general methodology for ensuring data privacy according to the invention. It will be recognized that the steps shown in the embodiment of FIG. 3 are high-level logical steps applicable to literally any network architecture, such as discussed above in FIGS. 2a-2c, and are not intended to require or imply any specific process flow that may occur within particular implementations of the method (or any particular location within the network or external thereto where the various entities 200, 206, 206, 208, 210 might reside, if used). In practical embodiments, some of these steps (or sub-steps within each step) may be implemented in parallel, on different hardware platforms or software environments, performed iteratively, performed in a permuted order, and so forth.

As shown in FIG. 3, per step 302, a plurality of tuning records are received. In one embodiment, the tuning records each comprise an anonymized data record indicating at least one interaction of the user with content. However, it is appreciated that each tuning record may indicate more than one user instantiated event (e.g., an "aggregated" record representative of events for tune-in, rewind, play, fast-forward, tune-out, etc.) with respect to a single content element. In a further embodiment, the records are received at the data privacy entity 200 as illustrated in FIG. 2a. The raw constituents of the records may also be received and assembled/anonymized by the receiving entity, such by way of encrypting the non-anonymized raw data or transmitting it via a secure channel, and then assembling the record(s).

Tuning records, as noted above, in the exemplary embodiment comprise information which is used to describe each action taken at a user device. For example, when a user requests to access programming, a tune-in record is created. Similarly, when a user changes a channel (i.e., requests different programming), a tune-away record is created (with respect to the first requested channel), and when the user turns off his device, a tune-out record is created. Additionally, records may be created which indicate activity with respect to trick modes functions such as fast forward, rewind, pause, etc. (e.g., time of invocation of the command, duration of the command, number of repeat or similar commands in a given time period, etc.). The tuning records may include for example the precise time at which the event of interest (e.g., user action) was performed or occurred, one or more channel or other program identifiers (e.g., tuned from Channel X, or tuned from Channel X to Channel Y), a device identifier, and an identifier of the action take (e.g., tune-in, tune-out, tune-away, etc.). Various other alternative tuning record data constructs useful as part of the invention will also be recognized by those of ordinary skill given the present disclosure.

As noted above, tuning records may be generated by each of the devices across an entire MSO footprint, or within selected portions or subsets thereof. In one embodiment, the methods and apparatus discussed in co-owned U.S. patent application Ser. No. 12/877,062 filed on Sep. 7, 2010 and entitled "METHODS AND APPARATUS FOR AUDIENCE DATA COLLECTION AND ANALYSIS IN A CONTENT DELIVERY NETWORK", now U.S. Pat. No. 9,635,421, previously incorporated herein, may be utilized for generating the aforementioned tuning records which are received at the data privacy entity 200.

The tuning records are in one embodiment collected across all available platforms (including for example VOD consumption, interactive consumption, linear/broadcast consumption, DVR usage, EPG interaction, etc.) in order to gather user/audience information in real-time or near-real time, with associated actions of actual users or viewers.

Next, at step 304, it is determined whether additional privacy measures are needed to protect the data records from e.g. derivative association or other such attacks. As noted above, the data records are in one embodiment received after having been anonymized. However, it may still be possible for an outside party to uniquely identify a user or device by the tuning record when combined with additional data. In such cases, the data is adjusted to increase the privacy thereof (step 306). If however, it is determined that the data is sufficiently anonymized as received, then at step 308, the data is transmitted.

Various methods for adjusting the data in order to increase privacy (step 306) are discussed herein. It is noted that once the data is adjusted (if necessary), it may be transmitted e.g., to a data analyzer 206. In another embodiment, the data is adjusted at e.g., the CPE 106 itself and/or a local service node 182. Accordingly, the adjusted data is transmitted (step 308) from these entities to a headend entity for further processing and/or directly to a third party analyzer 206.

Figure 4:
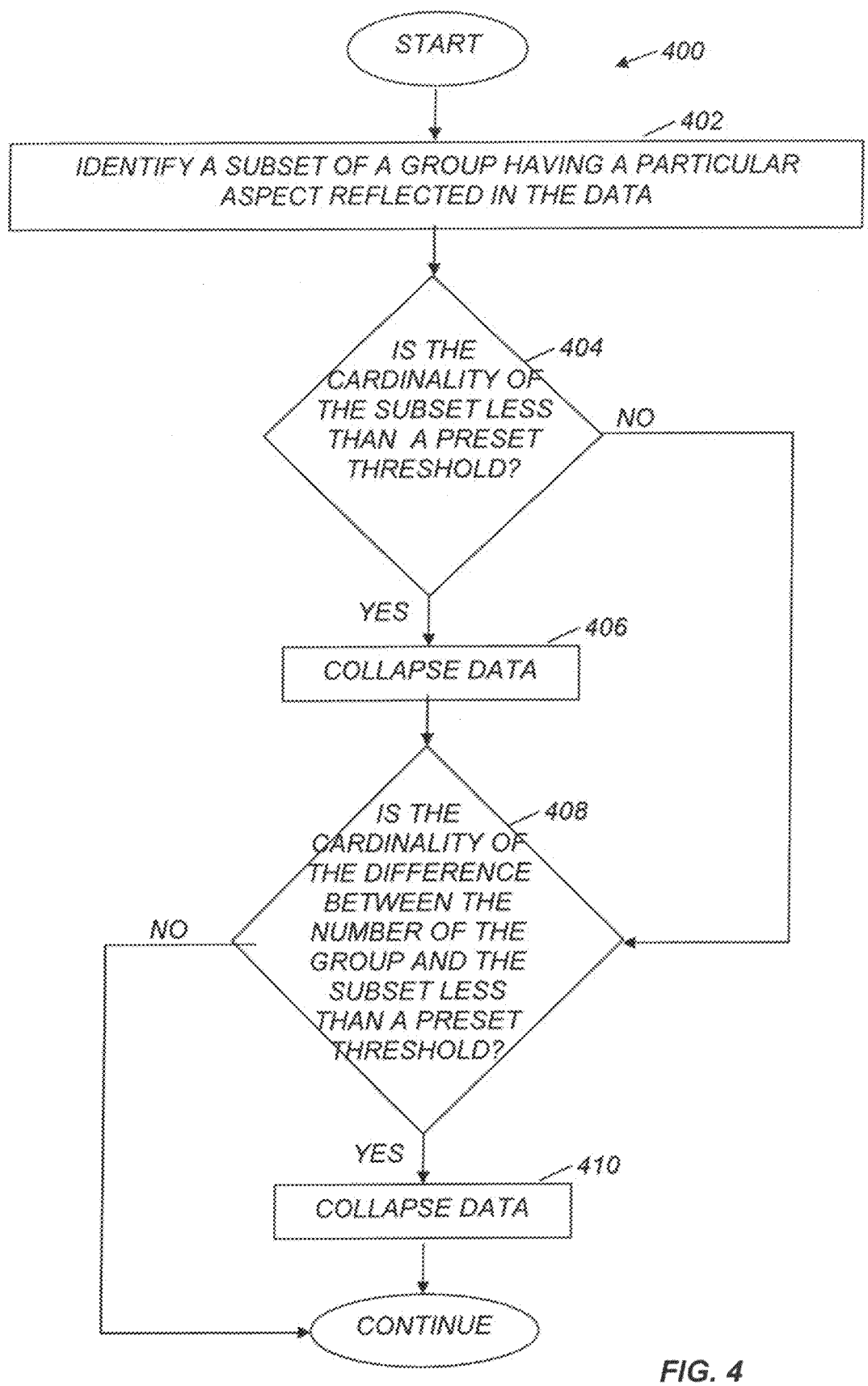
FIG. 4 is a logical flow diagram illustrating one implementation of a generalized method for increasing data privacy according to the present invention.

FIG. 4 illustrates an exemplary specific implementations of the generalized method discussed above, which may be utilized to determine when additional privacy measures are needed. This implementation is merely illustrative, and should not be considered to limit the broader invention.

Consider a set of tuning events, S. Each individual event, S, will itself be composed of a set of fields, F. Some of these fields, F, may be demographic in nature (zip code, education level, ethnicity, etc.). Some of these fields, F, may be behavioral (network, start time, duration, etc.). Yet others may be service related (whether the household in which the CPE is located which transmitted a specific tuning event, S, either has or does not have HSD service or phone service; the CPE itself may or may not have DVR capabilities). The fields may be (i) continuous (e.g., distance in miles or kilometers from London, England), (ii) continuous over a range (e.g., age between 23 and 42), (iii) "fuzzy" logic variables, such as "low", "medium" or "high", or "poor", "fair", "good", or "excellent"), and/or (iv) one of a set of possible discrete values (e.g., animal type—"cat", "human", "dog", "pig", etc.). Notice that any set of tuning events, S, that is constructed is finite (at the very least, the set is bounded by the most recent tuning event, S, received when the set is considered). Notice also the any set of fields, F, chosen will also be finite. Note that the foregoing statements are useful subsequently herein when describing exemplary embodiments of the algorithm for automatically collapsing a data set.

One can imagine selecting a subset of tuning event records, S, in such a way as to ensure that certain fields are identical for all selected events. For example, one could select from the set of all tuning events, S, only those from zip code 28114 and from households with HSD and voice service. Hence, the identity of a particular user or device may be derived in certain instances (although the data is anonymized), this is termed "derivative association". Mathematically, this selection process can be described as follows:

Select an $S' \subset S$ and an $F' \subset F$ such that:

$$\forall z_a \in S' \text{ and } z_b \in S' \text{ and } f \in F', z_{zp} = z_{bp} \qquad \text{Eqn. 1}$$

The problem of derivative association arises in one of two scenarios:

1) $|S'| < m_1$, where $m_1$ is an acceptable minimum number of households represented in the set of tuning records
2) $|S \oplus S'| < m_2$, where $m_2$ is an acceptable minimum number of households represented in the set of tuning records not in the constructed set S'

The first scenario discusses that if the cardinality of the subset, S', is less than a predetermined threshold value, $m_1$, the data is vulnerable to derivative association. In other words, if a subset is too small, the identity of the members of the subset becomes relatively easy to determine. In one embodiment, the threshold value which the cardinality of the subset is greater than, $m_1$, is 25, although it will be appreciated that this value is purely but one example value of many that could be chosen.

An example of scenario (1) might extend from the discussion above. Assume that S' is constructed of those records from homes in zip code 28114 and with both HSD and voice service. Further assume that only 10 households are actually represented in this set (i.e., there are only 10 so-called "triple-play" (voice, video and HSD) subscribers in zip code 28114). With only 10 households, an "attacker" with access to e.g., the operators billing system, could quite easily get the list of the 10 subscribers in zip code 28114 with voice, video, and HSD service. Then, it would be a relatively simple manner to conduct research against these households to specifically and uniquely to tie each to one of the 10 "anonymous" subscribers in S'. Thus, it seems reasonable that in this theoretical application, $m_1$ should be larger than 10. One can observe that, in the above scenario, if the field "zip code" did not exist at all in the set, S, it would have been much harder to construct a subset with such a low cardinality. This fact is forms a salient part of the exemplary embodiments of automatic collapsing system described herein.

Scenario (2) represents a situation where the subset the exclusive disjunction of the entire set, S, an the subset of "anonymous" subscribers, S' is less than a predetermined value $m_2$. In other words, if the subset, S', is too large, the identity of the members in the set, S, which are not in the subset, S', becomes relatively easy to determine. Stated differently, if the cardinality of a difference between the entire data set, S, and a first subset of data, S', is less than a predetermined threshold value, $m_2$, the data is vulnerable to derivative association.

Before discussing the algorithm for automatic data collection in greater detail, two additional concepts are introduced, those of precedence and "collapsing rules". One can imagine that a requestor of a data set places relatively more importance on certain fields than others. One requestor may grade "ethnicity" relatively high, but care little for "household income". Another, by contrast, may care a great deal about "household income", but have relatively less interest in "service mix". These qualitative statements are examples of what is meant by the term "precedence" in the present context, which can be loosely defined as the activity of a data consumer giving specific instructions or information as to what data is relatively more important than other data. Collapsing rules, on the other hand, are the mechanism whereby fields are "generalized" to make it more difficult to construct subsets, S', with low enough cardinality to make derivative association likely. There are generally four "types" of collapsing rules possible:

1) Replace—Replace one value for another (e.g. in an example of "animal type", one could conceive of a rule in which, depending on the animal type, one could replace the type with "mammal", "reptile", "bird", "fish", or "insect");
2) Broaden—Broaden a range (e.g. consider an age range, one could broaden a range by a percentage, thus changing the range (23, 42) to (21.7, 46.2)—10%);
3) Generalize—Generalize a value (e.g. a field, "distance from London, England", could be generalized to "distance from England"—meaning, for example the "center of mass" of the British Isles, etc.); and/or
4) Eliminate—remove the field all together (e.g. replace it with a default value).

With this background in mind, the basic framework to describe the algorithm for automatic data collapse has been built. In one embodiment, the system may be configured as follows:

When a set of anonymous tuning events, S, is going to be extracted, the requestor describes exactly which fields the requestor wishes. Additionally, the requestor indicates a collapsing precedence hierarchy (call it $c_{i,f}$, or the $i^{th}$ collapsing rule, affecting field $f \in F$, and enforcing collapsing rule (r))—call the set of ordered collapsing roles C. Additionally, an acceptable value for $m_1$ and $m_2$ is determined for the data set S.

With these preliminaries, the automatic collapse algorithm becomes:

---

1) For i=1 to |C|
   a. Let M be the set of all possible S' ⊂ S constructed as described above
   b. Let N be the set of all possible S⊕S' constructed as described above
   c. For j=1 to |M| (note M and N will have identical cardinality)
      i. calculate $|s_{m_j}'| = k_{m_j}$ where $s_{m_j}' \in M$
      ii. calculate $|s_{n_j}'| = k_{n_j}$ where $s_{n_j}' \in N$
   d. If min $(k_{n_j}) < m_2$, then error - the data set cannot be delivered in such a way as to minimize likelihood of derivative association
   e. If min $(k_{m_j}) < m_1$, then
      i. apply rule $c_{i,f}$
      ii. increment i
      iii. loop
   f. return the data set

---

The method of FIG. 4 utilizes the above-derived automatic collapse algorithm in one embodiment to ensure that the identity of the members of a subset of data is not determinable either because the subset is too small, or because the difference between the entire set and the subset is too small. The method relates to examining each of the aspects in the data fields to find those which may be vulnerable (e.g., which an identity of a user or device associated to a particular record(s) may be derived based on the given data). In one embodiment, the aspects are examined as described in Eqn. 1 and Scenarios (1) and (2) above.

At step 402 of the method of FIG. 4, a subset of a group is determined. Each member of the subset has a particular common aspect reflected in the data records (i.e., field). For example, each member of the subset may be within a certain zip code, have tuned into a particular program, be within a particular demographic, etc. Information relating to the common aspect is found within the tuning records discussed above. Hence, in one example, a plurality of tuning records are received (a group); among the tuning records, it is determined that a number of records share a certain aspect (a subset), such as e.g., zip code.

At step 404 of the exemplary method, it is next determined whether the cardinality of the subset is less than the preset threshold, $m_1$. If the cardinality of the subset is not less than the preset threshold value, $m_1$, the method continues to step 408. If the cardinality of the subset is less than the threshold value (i.e., is smaller than desired), the data is adjusted or collapsed to ensure privacy (step 406). As will be discussed below in greater detail with respect to FIGS. 5a-5d, various methods may be utilized to adjust or collapse the data and thus ensure privacy.

Next it is determined at step 408 whether the cardinality of the difference between the group and the subset is less than a preset threshold. In one embodiment, the same threshold value may be used for each step 404 and 408. Alternatively, different values may be prescribed. If the cardinality of the difference is not less than the preset threshold value, $m_2$, the method continues to step 412. If the cardinality of the subset is less than the threshold value (i.e., the subset is larger than desired), the data is adjusted or collapsed to ensure privacy of those not in the subset (step 410).

In another embodiment of the method of FIG. 4, additional steps (not shown) are performed after each data collapse (steps 406 and 410) to determine whether the collapsed data is still susceptible to a determination of the identity of the user and/or device, such as by re-determining whether the subset and/or difference meets the threshold requirement (i.e., is greater than, or less than the threshold, respectively). Other methods may also be utilized for determining whether the collapsed data is susceptible. If the identity of the user and/or devices of the subset may still be determined after the data collapse, another data adjustment or collapse may be performed. Hence, the process may be repetitively iterative (i.e., the same vulnerability analysis performed two or more times), or non-repetitively iterative (i.e., performing two or more different types or scopes of vulnerability analysis each one or more times).

The method may repeat to determine the vulnerability of the data with respect to additional aspect of a data set as well.

Data Collapse Methodology—

Figure 5A:
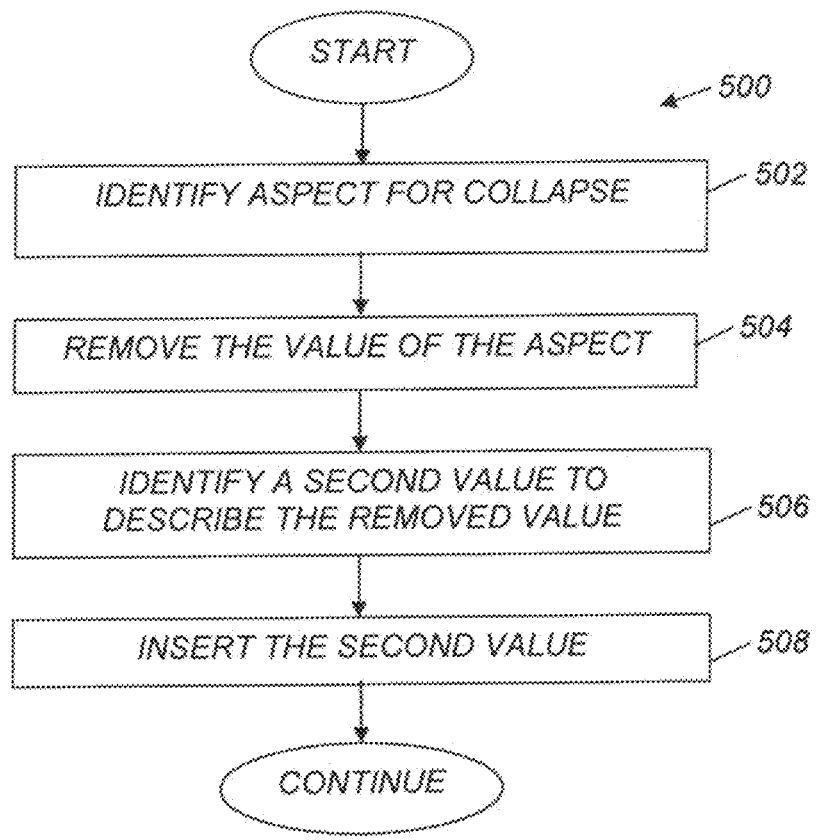
FIG. 5a is a logical flow diagram illustrating a first exemplary data collapse method for use in ensuring privacy according to the present invention.

Referring now to FIG. 5a, a first exemplary data collapse method for use in ensuring privacy according to the present invention is illustrated. As shown per step 502 of the method, one or more "aspects" is/are identified for data collapse. In one embodiment, the aspects are identified using the methods discussed above in FIGS. 3 and 4. For example, it may be determined that the subset is too small or too large with respect to the number of records having a zip code (aspect). At step 504 of the method, the value of the aspect (e.g., the zip code) is removed from the data records.

A second value is identified which describes the removed value at step 506. Continuing the example from above, the second value may comprise a geographic location to which the zip code belongs. Specifically, the zip code 78221 may be identified for collapse and removed (steps 502 and 504). The descriptive value "San Antonio, TX" or "Bexar County" (the foregoing which each have more than one zip code associated therewith, thereby increasing the ambiguity of which zip code the record is actually based) may then be identified at step 506 to describe the removed value (zip code 78221).

At step 508, the identified second value is inserted in place of the removed first value. Hence, "San Antonio, TX" or "Bexar County" replaces zip code 78221 in each of the data records of the subset of records previously having the 78221 zip code.

Figure 5B:
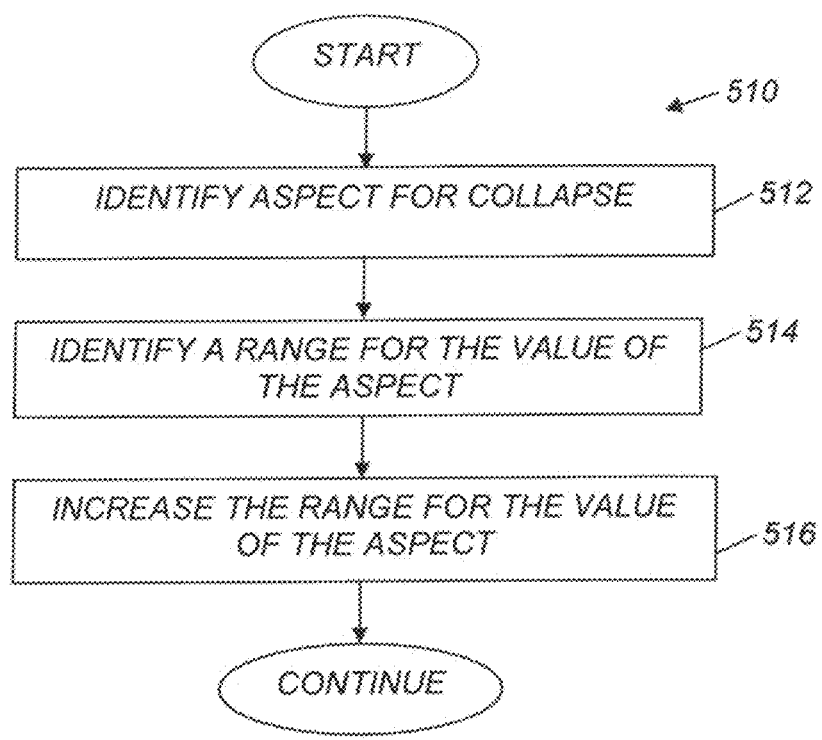
FIG. 5b is a logical flow diagram illustrating a second exemplary data collapse method for use in ensuring privacy according to the present invention.

Referring now to FIG. 5b, a second exemplary data collapse method for use in ensuring privacy according to the present invention is illustrated. At step 512, one or more aspects are identified for collapse. As noted above, the aspect(s) may be identified according to the methods of FIGS. 3 and 4. Alternatively, the aspect(s) may be identified manually such as by a network operator, or by other means.

Next, at step 514, a range is determined for the value of the aspect. Suppose for example, that the identified aspect is an age group (e.g., 25-30 inclusive). The range for the age group is identified as 6 years (step 514). Per step 516, the range is increased. Continuing the example above, the age range may be increased e.g., from 6 to 11 years, by a certain percentage, etc. Hence, the range 25-30 may be increased in each of the tuning records to e.g., 20-30 or 25-35 or 23-33, etc.

Figure 5C:
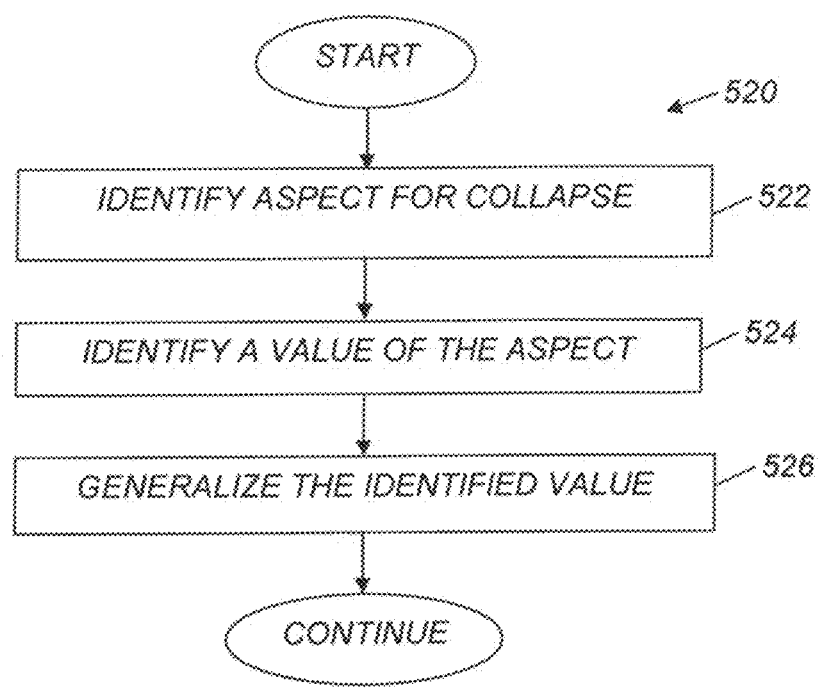
FIG. 5c is a logical flow diagram illustrating a third exemplary data collapse method for use in ensuring privacy according to the present invention.

Referring now to FIG. 5c, a third exemplary data collapse method for use in ensuring privacy according to the present invention is illustrated. As shown, per step 522 of the method, one or more aspects are identified for collapse. As noted above, these aspects or field may be identified manually, or automatically via the methods disclosed in FIGS. 3 and 4 above.

A value of the identified aspect is determined at step 524, and generalized at step 526. In one example, the value of the identified aspect may comprise a specific set top box type (such as a model number); this value may then be replaced with a general description of the device (such as by its features). Accordingly, tuning records having data relating to Cisco™ device model number CHS 435HDC may have the specific data replaced with e.g., "HD DVR" to generally describe that the device is HD compatible and contains a digital video recorder (DVR).

Figure 5D:
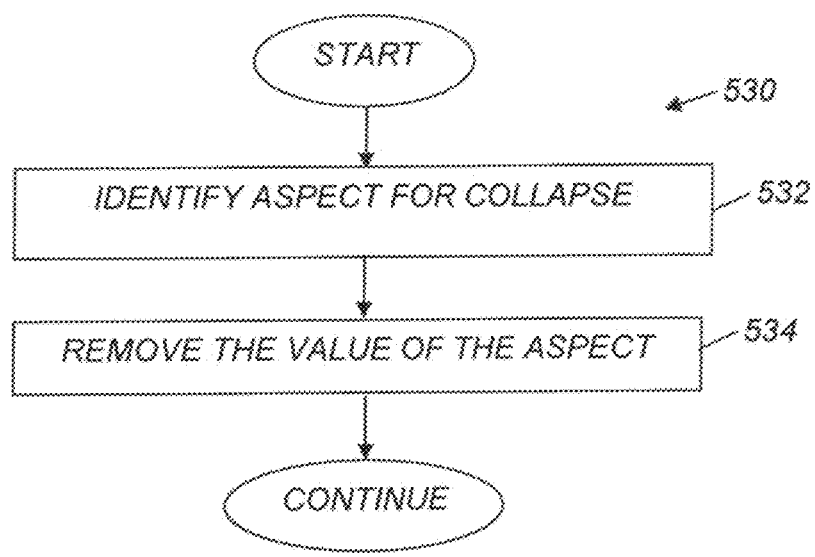
FIG. 5d is a logical flow diagram illustrating a fourth exemplary data collapse method for use in ensuring privacy according to the present invention.

Referring now to FIG. 5d, a fourth exemplary data collapse method for use in ensuring privacy according to the present invention is illustrated. At step 532 of the method an aspect is identified for collapse. Then, per step 534, the value of the aspect is removed. In one embodiment, the removed value may be replaced with a default value, "stuff" data (e.g., 0#FF), or place holder. It is appreciated that this form of data collapse may not be useful in certain business situations, as the data otherwise contained in the tuning record will be removed (discussed subsequently herein in greater detail).

Although FIGS. 5a-5d illustrate various means for collapsing or adjusting data to ensure privacy, it is appreciated that these are in no way intended to be limiting on the types or ways in which the data may be adjusted. For example, the data may be altered in other ways, such as e.g., by expanding the data to include in certain ones of the aspects features which were not previously recorded therein. Suppose for example a particular aspect within the tuning records relates to household income. This aspect may be expanded to include education and income in one embodiment. Suppose that another aspect relates to head of the household (e.g., male head of the household, etc.); this aspect may be expanded to further include number of people in the household, and so forth.

It is also recognized that an underlying principle of the foregoing methods is that values as modified are generally not misdescriptive (e.g., the wrong zip code, or the wrong equipment description). That being said, the present invention contemplates that certain forms of "misdescription" may be employed if desired. For instance, in one variant, the actual value may be encoded or altered according to an algorithm or scheme known to both the encoder and the recipient (decoder). In one example, the zip codes could be permuted or logically shifted/wrapped x places to the left or right (e.g., 78221 becomes 12287 under a "mirror" permutation scheme, or 22178 under the second scheme, where x=2). As yet another alternative, a cryptogram encoding scheme may be applied, wherein each letter of the alphabet (and optionally each number) is assigned an alternate letter/number value (e.g., A=F, F=T, etc.). The foregoing are merely very simple examples of such encoding, and hence more elaborate and difficult to decode schemes will be recognized by those of ordinary skill given the present disclosure. When a data record that has been encoded is received by a decoding entity, the decoding entity merely applies the decoding algorithm (inverse of encoder) to retrieve the "actual" data.

In another variant, multiple encoding schemes may be employed by a data source (e.g., MSO). The foregoing "encoding" schemes provide the advantage of maintaining with 100% fidelity the original information as collected (i.e., a user or recipient of the encoded data can retrieve exactly what was reflected in the original data without having it "watered down" by generalization or removal of data in prior embodiments. However, it also suffers from the drawback that if the encoding scheme is surreptitiously obtained, the user's privacy is jeopardized, whereas under the prior generalization/removal embodiments, no such jeopardization is possible.

Data Collapse Implementations—

Various operational rules may be utilized when implementing the data privacy mechanisms of the invention discussed herein.

In one embodiment, one or more of the above methods for data collapse (FIGS. 5a-5d) are used based on the type of data values in the identified aspect. For example, adjustments to a data range as described above in FIG. 5b will not be useful for aspects having values that are not easily expressed as a range. In this regard, the present invention contemplates a methodology selection algorithm or logic (e.g., computer program or other logical process) which evaluates the type of data, and determines one or more methods for adjustment that are useful or applicable for that type.

In a further embodiment, various ones of the above-described data collapse methods may be used in conjunction with one another to obtain a desired result. For example, it may be experimentally determined that adjustments which (i) replace a specific aspect (see FIG. 5a), and (ii) broaden the range of another specific aspect (see FIG. 5b), are useful in providing data which is no longer vulnerable to derivative association or other forms of identity determination. Accordingly, in one variant, once data is determined to be vulnerable, it may automatically be adjusted using these experimentally or anecdotally determined adjustments.

It is further appreciated that all of the tuning records, not only those having the identified aspect may be adjusted or collapsed according to the methods of FIGS. 5a-5d. For example, rather than adjusting only those records which are within zip code 78221, all zip codes may be replaced with a geographic descriptor (such as "San Antonio, TX"). Similarly all age ranges may be increased, so that fewer ranges are needed to describe all the records collected, thereby placing more records in each range and avoiding instances where the cardinality of a subset of the entire data set does not meet a particular threshold value. Suppose for example that tuning records utilize 10 groups of age ranges taking into account ages under 20-60 and over in 5 year increments; these instead would be replaced by six groups of age ranges taking into account ages under 20-60 and over in 10 year increments.

In yet another embodiment, an MSO (or other third party entity or operator) may be provided with one or more mechanisms to enable selection of particular aspects for collapse. In other words, the operator or other third party may actively control which ones of the aspects (e.g., fields) within the tuning records should be adjusted or collapsed. The operator (or other party) may further identify aspects (e.g., fields) within the tuning records which may not be collapsed or otherwise adjusted. For example, if a third party is particularly interested in a specific age range (such as 20-25), the operator may indicate that this aspect may not under any circumstances be altered. According to this embodiment, if it occurs that the data cannot be certified as no longer being vulnerable to e.g., derivative association, the operator may be notified, and the data held until further operator adjustments are made.

Still further, the MSO operator or other entity may be provided with a means to manually select the type(s) of collapse or adjustments to be performed on certain data. For example, a third party may be interested in a particular aspect of the data set, such as geographic area; however, the particular zip code may not be crucial to that party. Accordingly, the operator may indicate that the field for zip codes within the tuning records should not be eliminated (as discussed at FIG. 5d) but may otherwise be adjusted, such as according to the other data collapse embodiments (FIGS. 5a-5c).

Data Collection and Tuning Record Generation—

The herein described data privacy apparatus and methods are used in one embodiment to ensure the privacy of a plurality of tuning records collected at e.g., a tuning record collection entity (not shown) whether located at the network headend 150, local service node 182 or the CPE 106 themselves. Additionally, as previously described, the actual generation of tuning records may occur at one entity, while control thereof (including initiation, termination, determination of the collected data fields, etc.) may occur at a separate entity. In one embodiment, the CPE 1060 are configured to generate tuning records, while a headend entity controls the generation thereof, such as by initializing record generation, designating which fields will be present in the collected tuning records, etc.

As noted above, data may be collected across all or a subset of platforms (linear broadcast, on demand, DVR, etc.), and from all or a subset of the devices, in a content delivery network (such as a cable, satellite, or HFCu network). In one embodiment, tuning records are generated using the audience data collection and analysis apparatus and methods discussed in co-owned U.S. patent application Ser. No. 12/877,062, now U.S. Pat. No. 9,635,421, previously incorporated herein. As discussed therein data may be collected from various data sources, such as inter alia, a device/user data source, an switched digital video (SDV) data source, a subscriber data source, a video on-demand (VOD) data source, an application server (AS) data source, an advertisement data source, and an electronic program guide (EPG) data source. Collected data is transmitted to a data collection system, where the records are collected, processed and used to generate files for delivery to a subscriber data analysis (SDA) system, the delivered data being used for detailed analysis of user preferences, activity, and/or behavior. Information may also be collected under the present invention from the use of interactive applications (e.g., "iTV" or similar interactive applications).

It is further appreciated that the herein described methods and apparatus may also be utilize to ensure data privacy in other audience data collection systems such as those disclosed in co-owned U.S. patent application Ser. No. 12/503, 749 filed on Jul. 15, 2009 and entitled "METHODS AND APPARATUS FOR EVALUATING AN AUDIENCE IN A CONTENT-BASED NETWORK", now U.S. Pat. No. 9,178,634, which is incorporated herein by reference in its entirety. As discussed therein, audience or viewer qualities are identified, created and distributed to an advertisement management system and/or an advertisement decision maker in real-time (or near-real time). Additionally, the audience activities are monitored regarding, inter alia, broadcast, VOD, and DVR content. According to this embodiment, the data files containing information relating to audience or viewer qualities may be collapsed or otherwise adjusted prior to being distributed to the advertisement management system, advertisement decision maker, or other entity whether within the network or an outside party. Thus, the privacy of the subscribers and/or devices is secured prior to transmission thereof.

Anonymization—

As noted above, the collected data is particular to or identified with a particular subscriber, user, or user device. In one embodiment, the data may be anonymized by inter alia, the use of a cryptographic (e.g., one-way) hash to protect the privacy of the identified subscriber, user, and/or device. This may occur prior to or after the herein described data collapse. Furthermore, the anonymization process discussed herein may occur at e.g., the entity collecting the tuning records, the entity generating the tuning records, or a separate entity (i.e., at, inter alia, the CPE 106, PMD 107, or other user device, and/or the data privacy entity 200).

Exemplary techniques for providing anonymity utilizing a cryptographic hash described in U.S. patent application Ser. No. 11/186,452 filed Jul. 20, 2005 and entitled "METHOD AND APPARATUS FOR BOUNDARY-BASED NETWORK OPERATION", previously incorporated herein may be utilized in conjunction with the present invention to provide the aforementioned anonymization, although other techniques may be used with equal success. As disclosed therein, the identity of a CPE or subscriber is anonymized by using a cryptographic hash coupled with an optional "opaque" variable which carries information relating to the CPE of the hash with which it is associated. The hash and opaque variable frustrate de-encryption or reverse-engineering of the individual subscriber's identity or specific location.

In another embodiment, in order to protect subscriber anonymity, customer identifiers (e.g., MAC address, subscriber account numbers, customer account numbers) are made anonymous after being correlated with generic demographic information prior to delivery according to the methods discussed in co-owned U.S. patent application Ser. No. 12/877,062, now U.S. Pat. No. 9,635,421, previously incorporated herein.

Data Validation—

As discussed above, one embodiment of the invention uses the tuning record processing application 204 to process the tuning records prior to being transmitted to the data analyzer 206. In one variant, this processing includes inter alia a validation process to validate the tuning records and ensure the data contained therein is not missing, incorrect, or otherwise unable to be relied upon.

The validation process may be for example of the type disclosed in co-owned U.S. patent application Ser. No. 12/829,104, now U.S. Pat. No. 8,484,511, previously incorporated herein. As discussed therein, audience information is obtained directly from customer's premises equipment (e.g., set top boxes, cable modems, PCs, PMDs, IP devices, etc.) for each individual device, or even on a per-user basis where possible, thereby allowing a content provider or other analytical entity to gather specific information in large quantities across a broad geographical area, or demographic/psychographic slice. Advantageously, multiple sources of content to which viewership behavior relates can be simultaneously monitored, and subscriber anonymity or privacy maintained (i.e., no use is made of personally identifiable information). It is appreciated that the methods and apparatus of the present invention may further insure the privacy of this collected data.

In one embodiment, statistical methods (e.g., linear regression, log linear regression) are used to arrive at an expected value for one or more of the various fields and records of the collected data. Collected data is compared to the derived (e.g., average) or expected value, and if the data meets one or more prescribed criteria (e.g., is a given number of standard deviations away from the expected value or more) indicating that the data quality may be unacceptable, an error message is generated and the data optionally excluded. The criteria used to judge the data (e.g., number of standard deviations which the data is permitted to vary from the expected value) may be determined by the network operator, or an algorithm/computer program. This enables monitoring of an entire system proactively using a statistical or other method to alert the network operator only in the instance erroneous data meeting the test(s) of significance is received. Accordingly, a network operator may assess a large volume of data (in a comparatively contracted period of time) without requiring manual monitoring and/or error correction.

As noted above, the data can be collected across multiple platforms. That is, data regarding a users interaction with content may be collected and utilized regardless of the device or delivery paradigm over which the content is received or requested, the source of the content, the type of content (e.g., linear, VOD, DVR, high speed data, etc.), etc.

Latency Compensation—

The tuning record processing application 204 processes the tuning records before these are transmitted to the data analyzer 206. In one embodiment, this processing includes inter alia identifying and compensating for network and/or device latency to produce data which is reliable up to the second and descriptive of user interaction with content.

In one embodiment, the apparatus and methods disclosed in co-owned U.S. patent application Ser. No. 12/944,648, filed on Nov. 11, 2010 and entitled "APPARATUS AND METHODS FOR IDENTIFYING AND CHARACTERIZING LATENCY IN A CONTENT DELIVERY NETWORK", now U.S. Pat. No. 8,930,979, previously incorporated herein, may be utilized to provide identification and characterization of, and compensation for, latency that may be present in a content delivery network. As discussed therein, the timing of the tuning records collected from the devices is adjusted or "normalized", such as to a predetermined time base or reference. Once the records are so normalized, they may be relied upon as being accurate representations of subscriber interaction with content to a high level of granularity; e.g., on a second-by-second basis. In one embodiment, the amount of time which is accounted for (i.e., the amount by which the timing of the tuning records is adjusted) is determined by first determining a device-specific latency, which depends on the hardware and software features of the device. The device-specific latency is added to the latency inflicted by the network during transmission of data therein from the source to the premises.

The foregoing latency compensation provides a significant enhancement to inter alia the end-user of the tuning records described herein. Specifically, the end user may, by making use of the latency compensated records, correlate the behavior of one or more users to a specific point in "demographic/psychographic-time-content-event space". That is, the end user can literally pinpoint what action was taken by what type of subscriber at what point in time when viewing a given content element. This has appreciable utility to e.g., and advertiser, in that the advertiser can correlate on a second-by-second basis the reaction of an anonymous target demographic/psychographic user (or users) to particular aspects of an advertisement; e.g., as soon as Actor A was introduced, the user tuned away, thereby inferring that the user did not like Actor A. Moreover, this "pinpoint" subscriber behavioral data can be evaluated statistically, such as where tuning records from a number of different anonymous users of the same demographic/psychographic are evaluated as a whole to divine trends or patterns in the overall group behavior. The fact that this information can be presented anonymously (i.e., with the data collapsed or expanded) to third parties has great utility; the anonymized records can be bought or sold or transferred as a valuable commodity, yet with no possibility of subscriber identity or data compromise, which could be quite deleterious to the source (e.g., MSO).

Reporting—

As is also discussed above, the tuning record processing application 204 may be configured to further process the tuning records (prior to the transmission of the records to the data analyzer 206) by e.g., generating reports. In one embodiment, the reports may relate to the number of requests by one or more subscribers, devices, households, geographic zones, demographics/psychographics, etc. or over a particular time period. In this way, data regarding a plurality of users' interaction with content, which would generally tend to be too voluminous and detailed to be useful, may be summarized to produce useful and manageable data.

The analyzed data may also be utilized to support any number of business models, including e.g., to make business or operational decisions, make programming or advertising selection and/or insertion decisions "on the fly", etc.

In yet another embodiment, the tuning record processing reporting application 204 disposed at the network data privacy entity 200 may be configured to sort through the collected data, and parse this data into usable segments. For example, the data may be segmented or filtered to reflect (i) all usage for a particular premises, organization (e.g., enterprise), or device, (ii) usage across all or a subset of subscribers for a particular program or advertisement, (iii) usage across all users for a particular type of event, irrespective of the content to which it relates (e.g., tune-away events as a function of time of day), and so forth. Reports may also be generated on a per-user, per-household, per-content element, per demographic/psychographic variable, and/or per-device basis.

For example, using the methods and apparatus described herein, a single report may be generated illustrating (across a certain demographic of viewers of an advertisement) the number of viewers which tuned away, and precise times during the advertisement when the viewers did so. Using this information, an advertiser is able to determine e.g., overall penetration of an advertisement by determining the difference between the number of viewers tuned in at the beginning of the advertisement and the number which tuned away.

As will be discussed below, various business rules may be applied in generating reports, including generating certain reports as a purchasable commodity.

The "reports" may be rendered in literally any form, including as computer files, graphical representations, streams of data (e.g., periodically updated databases), GUI "dashboards", printed reports, etc.

Data Analysis—

As noted previously, the tuning records are analyzed at e.g., the data analyzer 206 of FIG. 2. It is appreciated that the data analyzer 206 may comprise an entity of a managed or unmanaged (e.g., MSO) network, and/or at a third party or non-network entity.

In one embodiment, the analyzer 206 is associated with a content provider (e.g., a programming content or advertising content provider), and the tuning records are analyzed in a manner similar to Nielson analysis, so as to determine viewership for a particular program, network, time of day, day of the week, etc. prior to the herein-described data collapse for privacy. The tuning records may also be analyzed "on the fly" for the purpose of providing targeted secondary content insertion opportunities. For example, if the collected data indicates that user or subscriber devices registered to the 92123 zip code often view (or are currently viewing) particular programming, then the network tuning record processing entity 200 (or other entity receiving the normalized and validated tuning records) may indicate to an entity providing advertising or other secondary content to the users in that zip code (such as e.g., a data analyzer 206 thereof) that targeted advertising may be provided to these devices during the particular programming. Such targeted advertising might address their common geography (e.g., a local upcoming event or service), a common demographic within that geography, and so forth.

Other data analysis may be performed at the data analyzer 206, the foregoing being merely illustrative of the broader concepts of the invention. For example, the tuning records may be analyzed to determine patterns of behavior for an individual subscriber, and/or a group of subscribers (such as a household, geographic group, demographic group, etc.). Viewership statistics or ratings may also be generated from the tuning records by the data analyzer in order determine monetary value of secondary content insertion opportunities, determine market penetration for advertisements, etc.

Exemplary User Device—

Figure 6:
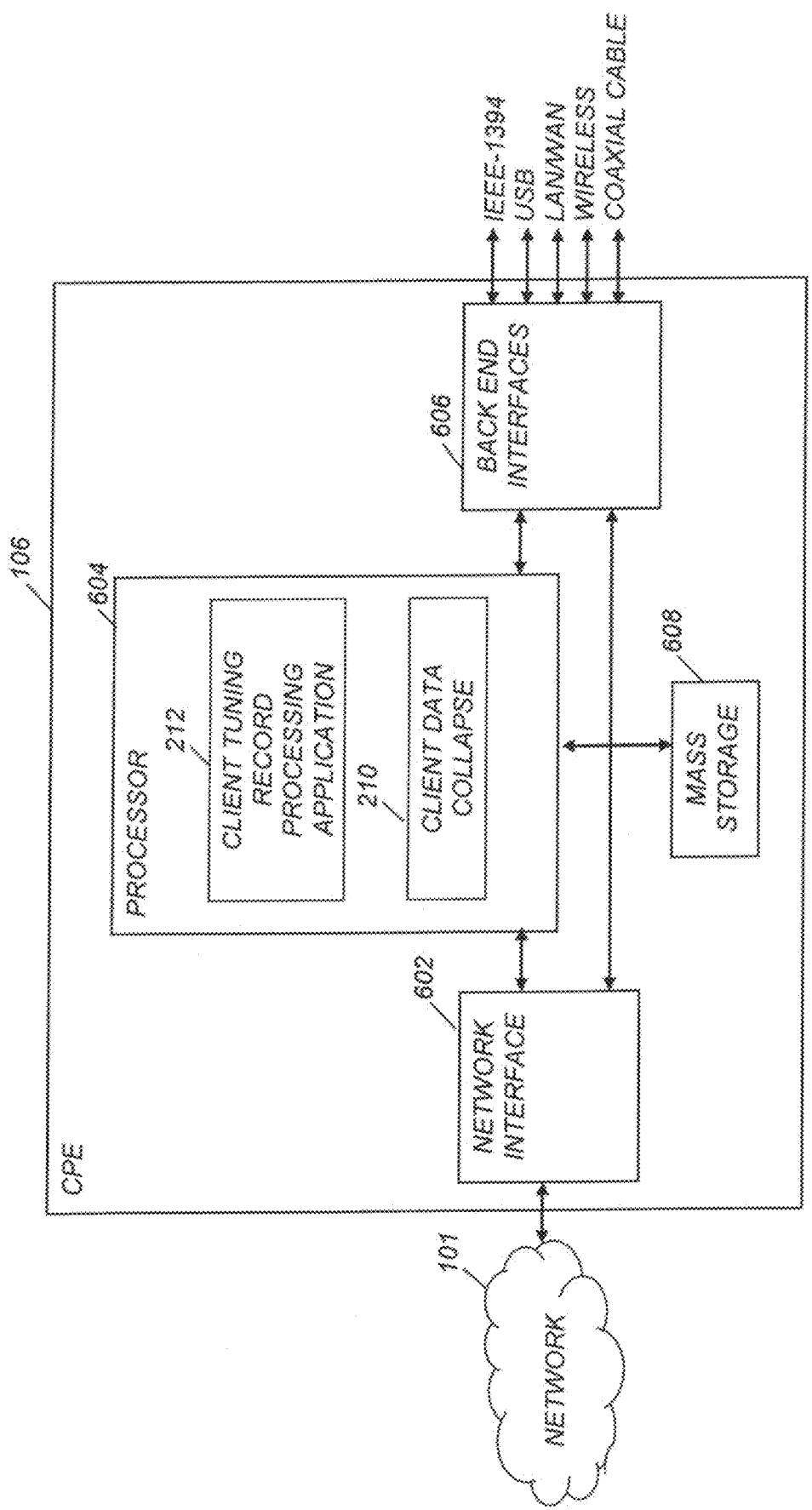
FIG. 6 is a block diagram illustrating an exemplary user device configured according to the present invention.

FIG. 6 illustrates an exemplary embodiment of a CPE 106 for use with the present invention. In one variant, this CPE 106 comprises a premises receiver such as a digital set top box (DSTB) or gateway, PC, or the like; however, it will be appreciated that the user device may further comprise a mobile device such as a PMD 107, smartphone, laptop computer, or other user-operated device.

As shown in FIG. 6, the exemplary device 106 generally comprises a network interface 602 configured to interface with the network(s) 101 of FIGS. 1-1*c*, one or more digital processor(s) 604, storage device(s) 608, and a plurality of interfaces 606 (e.g., video/audio interfaces, IEEE-1394 "FireWire", wireless LAN/PAN/MAN interfaces such as 802.16e (WiMAX), USB, serial/parallel ports, HDMI, DisplayPort, etc.) to interface with other end-user apparatus such as televisions, personal electronics, computers, WiFi or other network hubs/routers, etc. In one embodiment, the device may comprise an OpenCable (OCAP)-compliant embedded system having an RF front end (including tuner and demodulator/decryptors) for interface with an HFC network. Other components which may be utilized within the device (deleted from FIG. 6 for simplicity) various processing layers (e.g., DOCSIS MAC or DAVIC OOB channel, MPEG, etc.) as well as media processors and other specialized SoC or ASIC devices. The CPE 106 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The CPE 106 of FIG. 6 may also provided with an OCAP 1.0-compliant application and Java-based middleware which, inter alia, manages the operation of the device and applications running thereon (including the herein described client latency characterization application 208). It will be recognized by those of ordinary skill that myriad different device and software architectures may be used consistent with the tuning functions of the present invention, the device of FIG. 6 being merely exemplary. For example, different middlewares (e.g., MHP, ARIB, or ACAP) may be used in place of the OCAP middleware of the illustrated embodiment.

In another embodiment, the CPE 106 comprises a converged premises device, such as for example that described in co-owned U.S. patent application Ser. No. 11/378,129 filed Mar. 16, 2006 and entitled "METHODS AND APPARATUS FOR CENTRALIZED CONTENT AND DATA DELIVERY", now U.S. Pat. No. 8,347,341, incorporated herein by reference in its entirety. In yet another embodiment, the CPE 106 may comprise a gateway device such as that discussed in previously referenced, co-owned U.S. patent application Ser. No. 11/818,236 filed Jun. 13, 2007 and entitled "PREMISES GATEWAY APPARATUS AND METHODS FOR USE IN A CONTENT-BASED NETWORK", now U.S. Pat. No. 7,954,131.

In yet another embodiment, the CPE 106 comprises a media bridge apparatus such as that discussed in U.S. patent application Ser. No. 12/480,597, now U.S. Pat. No. 9,602,864, previously incorporated herein. As discussed therein, the CPE 106 may act as a connection between a portable media device (PMD) and a user's home network. This bridging apparatus may be used, for example, to convert content stored on the PMD (e.g., an MP3 player such as an iPod®) to a format capable of being presented on a user's set-top box or other client device. The media bridging apparatus (e.g., CPE 106) can also work within a premises network or trusted domain for media content, thereby allowing a subscriber total mobility in the premises network. For example, media content from the PMD may be accessed via extant networks for distribution to any STB, PC, mobile device, or other PMD. The media bridging device may also utilize the existing premises network (including a network defined by coaxial cable in the premises, such as a MoCA-enabled network) to allow devices and DVRs to provide media content to the PMD. According to this embodiment, tuning records may be obtained from the CPE and other client devices interacting with content from the PMD. Likewise, the tuning records may further relate to user interaction on the PMD with content received from the CPE or client devices. The privacy of the subscriber and/or the device from which the records were taken (e.g., the CPE or PMD) may be protected using the aforementioned data collapse methods.

As previously noted, in one embodiment, the CPE 106 of FIG. 6 may further comprise a client data collapse application 210 in the form of e.g., a software application running on the processor 604 of the CPE 106. This software application 210 may be configured to, when executed, perform any number of functions, including without limitation, receive one or more signals indicating whether additional privacy measures are needed to ensure the identity of the subscriber, user or device cannot be derived given the tuning records, and perform various ones of the methods of FIGS. 5a-5d for collapsing and/or adjusting the data to ensure privacy.

The CPE 106 may also comprise a client tuning record processing application 212 also running as a software application on the processor 604. According to this embodiment, the CPE 106 may, via the client tuning record processing application 212, (i) collect data regarding user- or device-specific activities such as tuning or activity logs, power on/off times/duration, PPV/VOD requests, frequency of use of other ancillary functions associated with the CPE, DVR or monitor operation and use (such as via communications from a connected DVR or monitor device), etc., (ii) process the data (including validate, determine and/or apply a latency, anonymize, etc.), (iii) generate reports relating to the collected data, and (iv) transmit the tuning records and/or reports to the data analyzer 206.

Alternatively, additional applications may be provided to run on the client device 106 to perform one or more of the aforementioned functions. The client application may also be integrated with other applications or software running on the CPE 106 if desired.

The foregoing diversity of possible configurations of the CPE 106 illustrates the general network-agnosticism of the present invention; i.e., user events of interest may span literally from cable or satellite or HFCu content delivery networks, to unmanaged IP networks, to MAN or longer range networks (e.g., WiMAX), to local or personal area networks, to ad hoc wireless networks. A "tune" event may comprise e.g., a linear broadcast channel change via a front-panel function or remote on a DSTB, or selection of an IPTV stream on a PC or other IP-enabled device, or selection of a VOD or PPV program, or invocation of a VoIP call, or selection of a hyperlink, startup or termination of an application, an error condition or event, or yet other types of activities as will be readily appreciated by those of ordinary skill given the present disclosure.

Network Data Privacy Entity—

Figure 7:
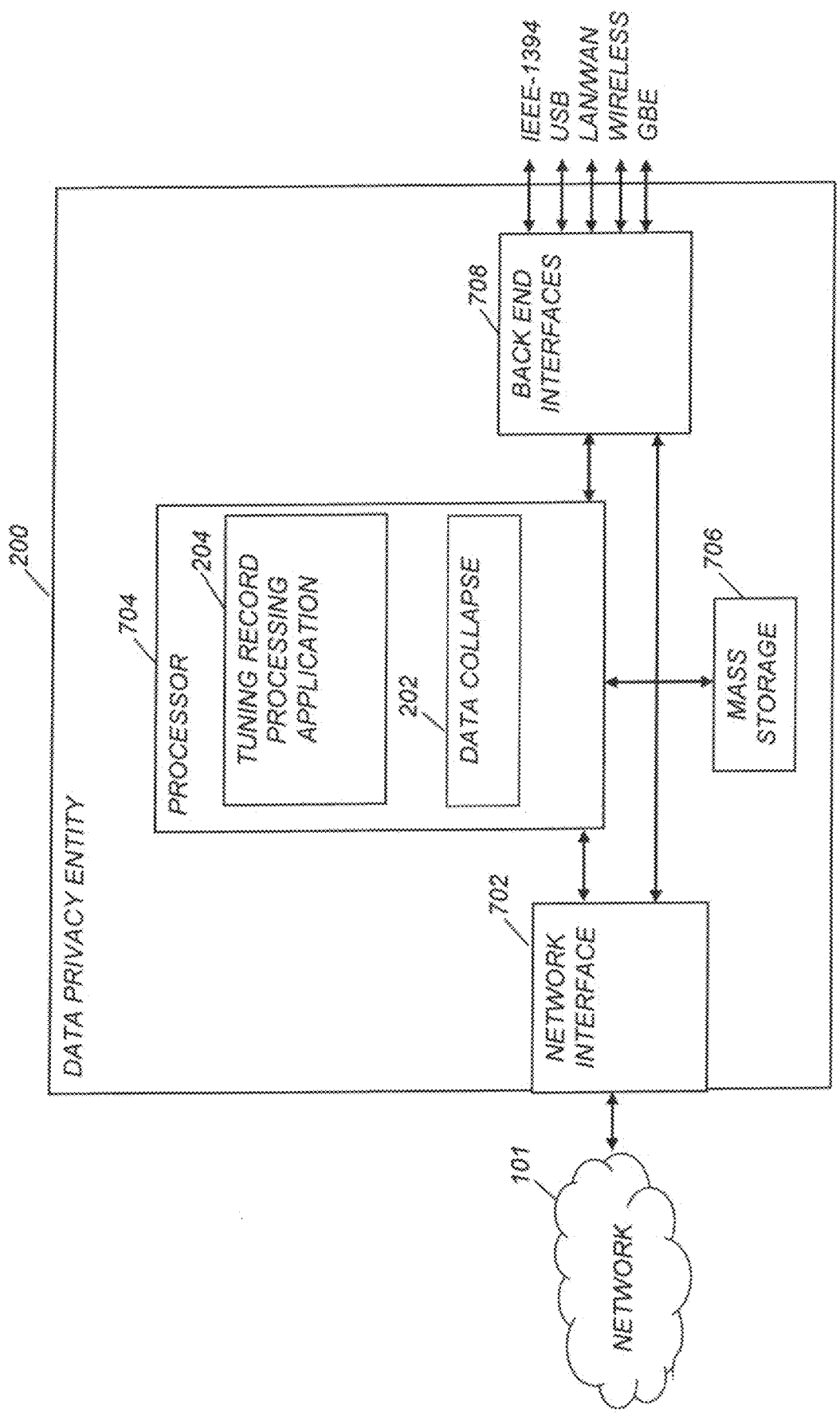
FIG. 7 is a block diagram illustrating an exemplary data privacy entity according to the present invention.

Referring now to FIG. 7, an exemplary configuration of the network data privacy entity 200 of FIG. 2 is described in detail. As noted above, in certain embodiments, the functions of the network data privacy entity 200 may be distributed across a plurality of devices, and may further make use of a proxy (not shown). Hence, the illustrated data privacy entity 200 may be disposed at the headend 150, a local service node 182, and/or at a third party.

The data privacy entity 200 generally comprises a network interface 702 for communication with the network 101, a processor subsystem 704 and associated storage 706, as well as additional interfaces 708 for communication with other entities.

The processor subsystem 704 is further configured to run a data collapse application 202 and a tuning record processing application 204 thereon. As noted previously, the foregoing may comprise e.g., distributed applications at a headend or third party entity, or yet other configurations of software known in the arts.

In one embodiment, the data collapse application 202 run on the processor 704 of the illustrated entity 200 may, as discussed above with respect to FIGS. 3 and 4, be utilized to determine whether a set of tuning records may be transmitted without jeopardizing the identities of the users or devices from which the records came. In the instance it is determined that tuning records may utilize additional privacy measures, the data collapse application 202 may transmit a message to a separate entity to collapse or adjust the data, such as a client data collapse application running on the CPE 106, or other entity. Alternatively, the data collapse application 202 running on the network data privacy entity 200 may be utilized to perform the aforementioned collapse or adjustment. The tuning records may be adjusted according to e.g., the method disclosed in previously discussed FIGS. 5a-5d above.

The tuning record processing application 204, when executed, enables inter alia the request and/or receipt of tuning records from the user devices. The application 204 processes the received records such as by validating the data, identifying and applying a latency value to the records, anonymizing the records, and analyzing the data to generate reports therefrom.

It is appreciated that the network data privacy entity 200 may comprise additional components (not shown) and functionality well known to those of ordinary skill in the network and embedded system fields, and accordingly not described further herein. For example, management or supervisory processes, and/or business rules software (described in greater detail below) may be run on the data privacy entity 200. Fail-over protection, additional physical or network security mechanisms, etc. may also be implemented.

Business/Operational Rules Engine—

In another aspect of the invention, the aforementioned data privacy entity 200 and/or the CPE 106 (e.g., including one or more computer programs for providing the above-mentioned functionalities thereof) optionally include an entity having an operations and/or business rules "engine". This engine comprises, in an exemplary embodiment, a series of software routines that are adapted to control the determination of whether the data collapse or adjustment functions as described herein should be performed, and to control the performance of these functions (or other functions described herein). These rules may also be fully integrated within the aforementioned one or more computer programs, and controlled via the entity on which the program is run, or remotely if desired. In effect, the rules engine comprises a supervisory entity which monitors and selectively controls the aforementioned functions at a higher level, so as to implement desired operational or business rules of the MSO or other parties of interest (e.g., content sources or advertisers).

The rules engine can be considered an overlay of sorts to the algorithms of the previously described computer applications. For example, the exemplary computer application may invoke certain operational protocols or decision processes based on data received (e.g., historical activity or user data, subscriber preferences, etc.), as well as network operational or historical data, demographic data, geographic data, etc. However, these processes may not always be compatible with higher-level business or operational goals, such as maintaining privacy, maximizing profit on a network-wide basis, or system reliability and/or flexibility. Moreover, the computer application being "supervised" may be operating on a per-CPE, per-household, or per-request basis (i.e., the collected data may be collected for individual CPE effectively in isolation, and analysis may be performed without considering larger patterns or decisions being made in the same service group, or network as a whole).

Hence, when imposed, the business/operational rules of the engine can be used to dynamically (or manually) control the operation of the aforementioned processes in conjunction with the data collapse determination, data collection, data processing (including validation, latency application, anonymization, etc.), analysis and transmission functions previously described.

For example, one rule implemented by the rules engine may comprise selectively performing the above functions resulting in collected viewership data only for certain users; e.g., those who have agreed to have their viewership data collected (whether for consideration or otherwise). Accordingly, only those users who affirmatively "opt in" will have data collected about their household or devices.

In another variant, certain content access, delivery or utilization features (e.g., enhanced functionality such as interactive programming, special features, advanced trailers, etc.) may only be provided to users who agree to have their tuning data collected.

In another variant, information regarding the end user of the content is provided to the engine for use in prioritizing data collection and event record generation. For example, in one implementation, if particular advertisements are associated with respective advertisers, then the MSO's profitability associated with each of these advertisers can be considered in the prioritization process. Specifically, if Advertiser A pays a higher rate for reports than Advertiser B, or Advertiser A pays a higher advertisement placement rate than Advertiser B, the rules engine might decide that collection of tuning data relating to the advertisement of Advertiser A is prioritized over that of Advertiser B. Such prioritization might include, for example: (i) under instances of competition for limited resources, Advertiser A is selected over Advertiser B; (ii) the level or granularity of data collected for Advertiser A is breater than that of Advertiser B; (iii) tuning data for Advertiser B is only collected when there are no outstanding needs or requests associated with Advertiser A, and so forth. Simply stated, the MSO may decide to devote its tuning records collection and management assets preferentially to those content sources who generate the most revenue and/or profit for the MSO.

Another business rule relates to distribution of the privacy enhanced tuning records; i.e., they may only be provided to particular parties (e.g., third parties such as third party data analyzers 206) who meet certain criteria. For instance, these criteria might relate to (i) reliability and/or quality standards; (ii) profitability or revenue potential; (iii) pre-qualification or certification by the MSO (irrespective of whether they would add revenue or profit for the MSO), such as for sufficient security for the data, sufficient processing capability, etc.; or (iv) the ability to provide certain time or quality or service (QoS) guarantees, etc., so that the MSO may ensure that the data will be protected and used efficiently and properly.

As previously noted, the "event" data obtained using the present invention (in various stages of processing, ranging from being merely latency-corrected to being validated, latency corrected, filtered, and enriched with ancillary data) may form a commodity of sorts which can be bought, sold, or bartered under any number of different business models. As can be appreciated, the ability to accurately yet anonymously characterize the behavior of millions of different users (many of whose demographics are known a priori) with respect to explicit events or portions of perceived content is a highly valuable commodity, especially for purposes of increasing advertising penetration and effectiveness (e.g., by proper placement and timing of advertisements, removal of objectionable or ineffective advertisements, etc.), and increasing MSO subscriber satisfaction (e.g., by giving subscribers a user experience which most closely tailors to their individual desires and needs). Hence, the present invention contemplates that the aforementioned tuning records may be sold as commodities, and even develop a secondary market of sorts for buying, selling and trading based on factors such as the demographics the data represents (i.e., very wealthy individuals or those who make frequent purchases historically), the type of events captured (e.g., certain events may be difficult to obtain data on, and hence more highly valued), the "half life" of the data and/or how long ago it was collected (i.e., certain types of data may only be relevant or useful for a certain limited period of time), and so forth.

In another aspect of the invention, the value or price of the records may relate to the granularity of the data. For instance, under prior art techniques, anonymization so that subscriber or user privacy was unequivocally protected might entail deleting data that would otherwise be useful or valuable to the end consumer of the data/report. Under the mechanisms of the present invention, data may be "collapsed" or otherwise processed so as to maintain at least some detail on this information, rather than simply deleting it (e.g., modification of the zip code from an explicit numerical value to a more generalized area designation). The degree of modification or generalization (consistent with still maintaining source privacy) might support different price points, products or views since more specific data is generally more useful to end users.

Many other approaches and combinations of various operational and business paradigms are envisaged consistent with the invention, as will be recognized by those of ordinary skill when provided this disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention.

The scope of the invention should be determined with reference to the claims.

What is claimed is:

1. A computerized apparatus for use in a content distribution network, said computerized apparatus comprising:
   at least one data interface configured to perform data communication with one or more service nodes of the content distribution network; and
   storage apparatus comprising at least one computer program; and
   a processor apparatus in data communication with the at least one data interface and the storage apparatus, the processor apparatus configured to execute the at least one computer program, the at least one computer program comprising a plurality of instructions configured to, when executed, cause the computerized apparatus to:
   cause at least one service node to obtain a plurality of tuning data records, the plurality of tuning data records comprising user data indicative of at least one interaction of a subscriber with content data;
   cause the at least one service node to determine whether a privacy measure is necessary to protect the user data from at least one or more privacy attacks; and
   enable the at least one service node to:
      responsive to a determination that the privacy measure is necessary based at least on a first threshold and a second threshold being satisfied by respective first and second numbers, the first number relating to a first portion of the plurality of tuning data records, the second number relating to a relationship between the plurality of tuning data records and the first portion of the plurality of tuning data records, adjust at least a subset of values of the user data to produce adjusted user data, and transmit the adjusted user data to the computerized apparatus; and
      responsive to a determination that the privacy measure is not necessary, the determination based at least on at least one of the first threshold or the second threshold not being satisfied, transmit the user data to the computerized apparatus.

2. The computerized apparatus of claim 1, wherein the plurality of instructions are further configured to, when executed, cause the computerized apparatus to, enable the at least one service node to, responsive to the determination that the privacy measure is necessary:
   transmit the adjusted user data to a data analyzer in data communication with the computerized apparatus; and
   determine behavioral data correlated to the subscriber.

3. The computerized apparatus of claim 1, wherein the adjustment of the at least subset of values corresponding to the user data comprises a collapse of at least a portion of the subset of values.

4. The computerized apparatus of claim 3, wherein the collapse of the at least the portion of the subset of values comprises a replacement of the portion of the subset of values, where the replacement comprises (i) removal of a first value associated with the portion of the subset, (ii) identification of a second value, the second value being descriptive of the removed value, and (iii) insertion of the second value in place of the removed first value.

5. The computerized apparatus of claim 3, wherein the collapse of the at least the portion of the subset of values comprises broadening of the portion of the subset of values, where the broadening comprises (i) determination of a range associated with a value associated with the portion of the subset, and (ii) increase of the determined range.

6. The computerized apparatus of claim 3, wherein the collapse of the at least the portion of the subset of values comprises generalization of the portion of the subset of values, where the generalization comprises a replacement of a first value associated with the portion of the subset with a second value having a general description of the first value.

7. The computerized apparatus of claim 3, wherein the collapse of the at least the portion of the subset of values comprises removal of a first value associated with the portion of the subset, and insertion of a default value in place of the removed first value.

8. A computerized method of ensuring privacy of data, the computerized method comprising:
   receiving and validating a plurality of data representative of anonymized data records, the validating comprising:
      determining an expected value for at least a portion of a subset of the plurality of data representative of anonymized data records; and
      in response to a determination that the expected value meets one or more prescribed statistical criteria, performing at least one remedial action, the at least one remedial action comprising excluding the portion of the subset of the plurality of data from the data representative of the anonymized data records to generate a modified plurality of data representative of anonymized data records;
   evaluating the modified plurality of data representative of anonymized data records to identify at least a susceptibility to derivative association, the identification being based at least on a cardinality associated with the subset of the data representative of anonymized data records; and
   in response to the identification of the at least susceptibility, collapsing at least a portion of the modified plurality of data representative of anonymized data records to produce a collapsed portion of the subset.

9. The computerized method of claim 8, wherein the identification of the at least susceptibility comprises determining that the cardinality associated with the subset of the data representative of anonymized data records is less than a prescribed threshold value.

10. The computerized method of claim 8, further comprising cryptographically securing the plurality of data representative of anonymized data records via a hash added to at least one variable, the at least one variable comprising data uniquely identifying at least one computerized client device;
   wherein the receiving of the plurality of data representative of anonymized data records comprises receiving the plurality of data from at least one computerized client device in a content delivery network.

11. A non-transitory computer-readable apparatus comprising a storage medium, the storage medium having at least one computer program stored thereon, the at least one computer program comprising a plurality of instructions configured to, when executed by a processor apparatus:

cause access of a data record relating to an interaction of a subscriber of a content distribution network with at least portions of content provided via the content distribution network, the data record being at least a portion of a subset of a plurality of data records;

based on a determination that a privacy measure is necessary and a determination that a first cardinality associated with the subset is less than a prescribed threshold, cause execution of a data privacy enhancement protocol on the data record to produce an adjusted data record;

based on a determination that the first cardinality associated with the subset is equal to or greater than the prescribed threshold, determine whether another cardinality of a difference between (a) the first cardinality associated with the subset, and (b) a cardinality of the plurality of records, is less than a second prescribed threshold, the another cardinality associated with both the subset and with the plurality of data records as a whole; and based on a determination that the another cardinality is less than the second prescribed threshold, execute the data privacy enhancement protocol on the data record.

12. The non-transitory computer-readable apparatus of claim 11, wherein the user data associated with the subscriber comprises one or more of: (i) data comprising an identity of the subscriber and (ii) data comprising an identifier of a computerized client device associated with the subscriber.

13. The non-transitory computer-readable apparatus of claim 11, wherein the execution of the data privacy enhancement protocol comprises at least an adjustment of the data record, the adjustment of the data record comprising one or more of: (i) replacement of a portion of the data record, (ii) broadening of a discrete value of the data record into a range of values, and (iii) generalization of a portion of the data record.

14. A non-transitory computer-readable apparatus comprising a storage medium, the storage medium having at least one computer program stored thereon, the at least one computer program comprising a plurality of instructions configured to, when executed by a processor apparatus, cause a computerized apparatus to:

access a data record relating to an interaction of a subscriber of a content distribution network with at least portions of content provided via the content distribution network, the data record being at least a portion of a subset of a plurality of data records, the accessed data record comprising at least a plurality of tuning records collected from one or more computerized client devices associated with the subscriber;

determine whether a privacy measure is necessary to protect the data record from derivation of user data associated with the subscriber, the determination comprising an evaluation of (i) a first cardinality associated with the subset, and (ii) a second cardinality derived from a difference between the subset and the plurality of data records;

based on a determination that the privacy measure is necessary, execute a data privacy enhancement protocol on the data record to produce an adjusted data record; and transmit the adjusted data record to a computerized network entity of the content distribution network, the computerized network entity configured to:
process the plurality of tuning records to determine a latency associated with the transmission of the adjusted data record, the latency being correlated to a reliability of the plurality of tuning records; and
normalize timing data associated with the plurality of tuning records to a predetermined reference so as to compensate for the latency, the normalization enabling a correlation of the interaction of the subscriber with the at least portions of the content provided via the content distribution network with respect to one or more of demographic and psychographic information related to the subscriber.

15. The non-transitory computer-readable apparatus of claim 14, wherein the execution of the data privacy enhancement protocol comprises at least an adjustment of the data record, the adjustment comprising adjustment of at least subset of values corresponding to the user data and a collapse of at least a portion of the subset of values.

16. The non-transitory computer-readable apparatus of claim 15, wherein the collapse of the at least the portion of the subset of values comprises a replacement of the portion of the subset of values, where the replacement comprises (i) removal of a first value associated with the portion of the subset, (ii) identification of a second value, the second value being descriptive of the removed value, and (iii) insertion of the second value in place of the removed first value.

17. The non-transitory computer-readable apparatus of claim 15, wherein the collapse of the at least the portion of the subset of values comprises broadening of the portion of the subset of values, where the broadening comprises (i) determination of a range associated with a value associated with the portion of the subset, and (ii) increase of the determined range.

18. The non-transitory computer-readable apparatus of claim 15, wherein the collapse of the at least the portion of the subset of values comprises generalization of the portion of the subset of values, where the generalization comprises a replacement of a first value associated with the portion of the subset with a second value having a general description of the first value.

19. A computerized method of ensuring privacy of data in a content distribution network, the computerized method comprising:

receiving a plurality of data representative of anonymized data records;

algorithmically evaluating the plurality of data representative of the anonymized data records to identify a susceptibility to derivative association, the identification being based at least on a first cardinality derived from a deviation between (i) the data representative of anonymized data records and (ii) a subset of the data representative of anonymized data records;

based on the identification of the susceptibility, algorithmically collapsing at least a portion of the subset of the data representative of anonymized data records to produce a collapsed portion of the subset; and validating the plurality of data representative of anonymized data records, the validating comprising:
algorithmically determining an expected value for at least the portion of the subset of the data representative of the anonymized data records;
algorithmically evaluating the determined expected value against one or more prescribed statistical criteria; and
based on a determination that the expected value meets the one or more prescribed statistical criteria, algorithmically performing at least one remedial action, the at least one remedial action comprising at least excluding the portion of the subset of the data representative of the anonymized data records from the data representative of the anonymized data records.

20. The computerized method of claim 19, wherein the algorithmically evaluating of the plurality of data representative of the anonymized data records to identify the susceptibility comprises algorithmically determining that the first cardinality is less than a prescribed threshold value.

21. The computerized method of claim 20, wherein the algorithmically evaluating of the plurality of data representative of the anonymized data records to identify the susceptibility to the derivative association is further based on a second cardinality associated with the subset of the data representative of the anonymized data records, the second cardinality being different from the first cardinality.

22. The computerized method of claim 19, wherein the algorithmically collapsing of the portion of the subset of the data representative of the anonymized data records comprises algorithmically selecting one or more of: (i) replacing the at least portion of the subset of the data representative of the anonymized data records, (ii) broadening the at least portion of the subset of the data representative of the anonymized data records, or (iii) generalizing the at least portion of the subset of the data representative of the anonymized data records.

23. The computerized method of claim 19, wherein:
the receiving of the plurality of data representative of the anonymized data records comprises receiving the plurality of data from at least one computerized client device in the content distribution network, the plurality of data further comprising data indicative of at least one interaction of a user of the at least one computerized client device with content data accessible via the content distribution network; and the method further comprises:
transmitting the collapsed portion of the subset of the data representative of the anonymized data records to a computerized network entity in data communication with the at least one computerized client device.

24. The computerized method of claim 23, further comprising algorithmically cryptographically securing the plurality of data representative of the anonymized data records via a one-way hash added to at least one variable, the at least one variable comprising data uniquely identifying the at least one computerized client device.

* * * * *